US009278838B2

(12) United States Patent
Apps et al.

(10) Patent No.: US 9,278,838 B2
(45) Date of Patent: Mar. 8, 2016

(54) KEG DELIVERY SYSTEM WITH KEG RACK TIER HALF

(71) Applicant: Rehrig Pacific Company, Los Angeles, CA (US)

(72) Inventors: William P. Apps, Alpharetta, GA (US); Sean T. Ogburn, Hoschton, GA (US); Ryan C. Meers, West Chester, PA (US); Paul Thomas Walton, Jr., Newark, DE (US); Ian C. McDermott, Lincoln University, PA (US); Ronald Samuel Ward, Edgewater Park, NJ (US); Steven Alan Kitchin, Warrington, PA (US)

(73) Assignee: Rehrig Pacific Company, Los Angeles, CA (US)

( * ) Notice: Subject to any disclaimer, the term of this patent is extended or adjusted under 35 U.S.C. 154(b) by 8 days.

(21) Appl. No.: 13/756,854

(22) Filed: Feb. 1, 2013

(65) Prior Publication Data

US 2013/0216339 A1 Aug. 22, 2013

Related U.S. Application Data

(60) Provisional application No. 61/677,587, filed on Jul. 31, 2012, provisional application No. 61/593,431, filed on Feb. 1, 2012.

(51) Int. Cl.
*A47B 73/00* (2006.01)
*A47B 43/00* (2006.01)
(Continued)

(52) U.S. Cl.
CPC . *B66F 9/00* (2013.01); *A47B 53/00* (2013.01); *A47B 81/007* (2013.01); *A47B 87/02* (2013.01);
(Continued)

(58) Field of Classification Search
CPC .... A47B 81/007; A47B 73/006; A47B 53/00; A47B 6/307; A47B 87/027; A47B 47/0091; A47B 87/007; A47B 87/02; A47B 87/0215; A47B 87/0223; A47B 87/0261; A47B 87/0276; A47B 87/0292; A47B 73/00; B65G 1/06; B60P 3/055; B62B 3/16; A47F 7/283; A47F 7/281; A47F 7/007; A47F 7/28; B65D 19/44; B65D 81/26; B65D 71/70; B65D 85/302; B65D 1/243; B65D 85/305; B65D 21/02; B65D 21/0209; B65D 19/00; B65D 2571/00043; B66F 9/00; F16G 11/00; Y10T 24/45
USPC ............ 211/74, 194, 59.4, 85.22, 85.18, 188; 206/509, 511, 512, 513, 507, 3, 427, 206/446, 503
See application file for complete search history.

(56) References Cited

U.S. PATENT DOCUMENTS

| | | | |
|---|---|---|---|
| 2,244,524 | A | 6/1941 | Lima |
| 3,141,537 | A | 7/1964 | Dillaha |

(Continued)

FOREIGN PATENT DOCUMENTS

| | | | |
|---|---|---|---|
| DE | 1943384 | U | 7/1966 |
| DE | 4221955 | A1 | 1/1994 |

(Continued)

OTHER PUBLICATIONS

International Preliminary Report on Patentability for International Application No. PCT/US2013/024360 mailed on Aug. 14, 2014.

(Continued)

*Primary Examiner* — Jennifer E Novosad
(74) *Attorney, Agent, or Firm* — Carlson, Gaskey & Olds P.C.

(57) ABSTRACT

A keg delivery system includes a rack having a plurality of bays for receiving kegs horizontally. The keg delivery system also includes elements for controllably lowering a keg from one of the bays to a floor.

31 Claims, 45 Drawing Sheets

(51) Int. Cl.

| | |
|---|---|
| ***A47B 47/00*** | (2006.01) |
| ***A47B 57/00*** | (2006.01) |
| ***A47G 29/00*** | (2006.01) |
| ***B66F 9/00*** | (2006.01) |
| ***A47F 7/28*** | (2006.01) |
| ***A47B 87/02*** | (2006.01) |
| ***B60P 3/055*** | (2006.01) |
| ***B65D 19/44*** | (2006.01) |
| ***A47B 81/00*** | (2006.01) |
| ***A47B 53/00*** | (2006.01) |
| ***B65D 19/00*** | (2006.01) |
| ***F16G 11/00*** | (2006.01) |

(52) U.S. Cl.

CPC ............... *A47B 87/0207* (2013.01); *A47F 7/28* (2013.01); *A47F 7/283* (2013.01); *B60P 3/055* (2013.01); *B65D 19/00* (2013.01); *B65D 19/44* (2013.01); *F16G 11/00* (2013.01); *B65D 2571/00043* (2013.01); *Y10T 24/45* (2015.01)

(56) References Cited

U.S. PATENT DOCUMENTS

| | | | | |
|---|---|---|---|---|
| 3,231,110 | A | 1/1966 | Bossell et al. | |
| 3,870,155 | A * | 3/1975 | Galloway | 211/74 |
| 4,093,076 | A * | 6/1978 | Newton | 211/74 |
| 4,099,626 | A * | 7/1978 | Magnussen, Jr. | 211/60.1 |
| 4,143,784 | A * | 3/1979 | Frahm et al. | 215/12.1 |
| 4,520,941 | A * | 6/1985 | Hagan et al. | 220/675 |
| 5,405,042 | A * | 4/1995 | Apps et al. | 220/510 |
| 6,026,958 | A * | 2/2000 | Kelly et al. | 206/503 |
| 6,135,297 | A * | 10/2000 | DeShazo et al. | 211/74 |
| 6,142,300 | A * | 11/2000 | Kelly et al. | 206/503 |
| 6,290,074 | B1 * | 9/2001 | Syvuk et al. | 211/74 |
| 6,502,705 | B1 * | 1/2003 | Ziegler | 211/74 |
| 6,561,466 | B1 * | 5/2003 | Myers et al. | 248/74.4 |
| 6,811,042 | B2 * | 11/2004 | Kelly et al. | 211/74 |
| 6,976,594 | B1 * | 12/2005 | Young | 211/85.18 |
| 7,007,900 | B2 * | 3/2006 | Goodwin et al. | 248/68.1 |
| 7,175,138 | B2 * | 2/2007 | Low et al. | 248/68.1 |
| 7,997,213 | B1 * | 8/2011 | Gauthier et al. | 108/55.1 |
| 8,074,945 | B2 * | 12/2011 | Schoenau et al. | 248/74.4 |
| 8,100,273 | B2 * | 1/2012 | Apps | 211/74 |
| 2004/0026346 | A1 | 2/2004 | Kelly et al. | |
| 2007/0206324 | A1 * | 9/2007 | Donnell et al. | 360/133 |
| 2008/0083683 | A1 * | 4/2008 | Apps et al. | 211/74 |
| 2008/0142459 | A1 * | 6/2008 | Donnell et al. | 211/74 |
| 2010/0247276 | A1 | 9/2010 | Loria | |
| 2012/0318763 | A1 * | 12/2012 | Garton et al. | 211/85.22 |
| 2013/0216339 | A1 * | 8/2013 | Apps et al. | 414/304 |

FOREIGN PATENT DOCUMENTS

| | | | |
|---|---|---|---|
| EP | 1801039 | A1 | 6/2007 |
| EP | 2011687 | A2 | 1/2009 |
| GB | 2417476 | A | 3/2006 |

OTHER PUBLICATIONS

International Search Report and Written Opinion for International Application No. PCT/US2013/024360 completed on Aug. 29, 2013.

* cited by examiner

KEG DELIVERY SYSTEM WITH KEG RACK TIER HALF

BACKGROUND

Kegs are delivered to stores, restaurants and bars by delivery trucks. The truck may be filled with many kegs of different kinds of beers. The kegs are large and heavy when filled. At the time of delivery, some kegs might have to be moved to find the correct kind of beer for the present delivery.

SUMMARY

Several improved keg delivery systems are disclosed. In one keg delivery system, the kegs are stored horizontally on racks in a bay of the truck. The horizontal storage makes it easier to identify and access the correct kegs when making a delivery. The keg delivery system may further include means for lowering a selected keg from the rack to the truck bay interior surface or to the ground.

In one embodiment, the means for lowering includes a slide that can selectively be mounted to the rack, so that the keg can slide down from the rack to the floor or ground.

In other embodiments, the means for lowering includes a motor selectively retracting and extending a cable secured to one of the kegs.

In another feature, the rack is comprised of a plurality of plastic keg tier halves. Each keg tier half is identical, and every other keg tier half is inverted and stacked upon (or is stacked upon by) and adjacent keg tier half. The adjacent keg tier halves define bays for receiving the kegs.

DETAILED DESCRIPTION OF THE PREFERRED EMBODIMENTS

Figure 1:
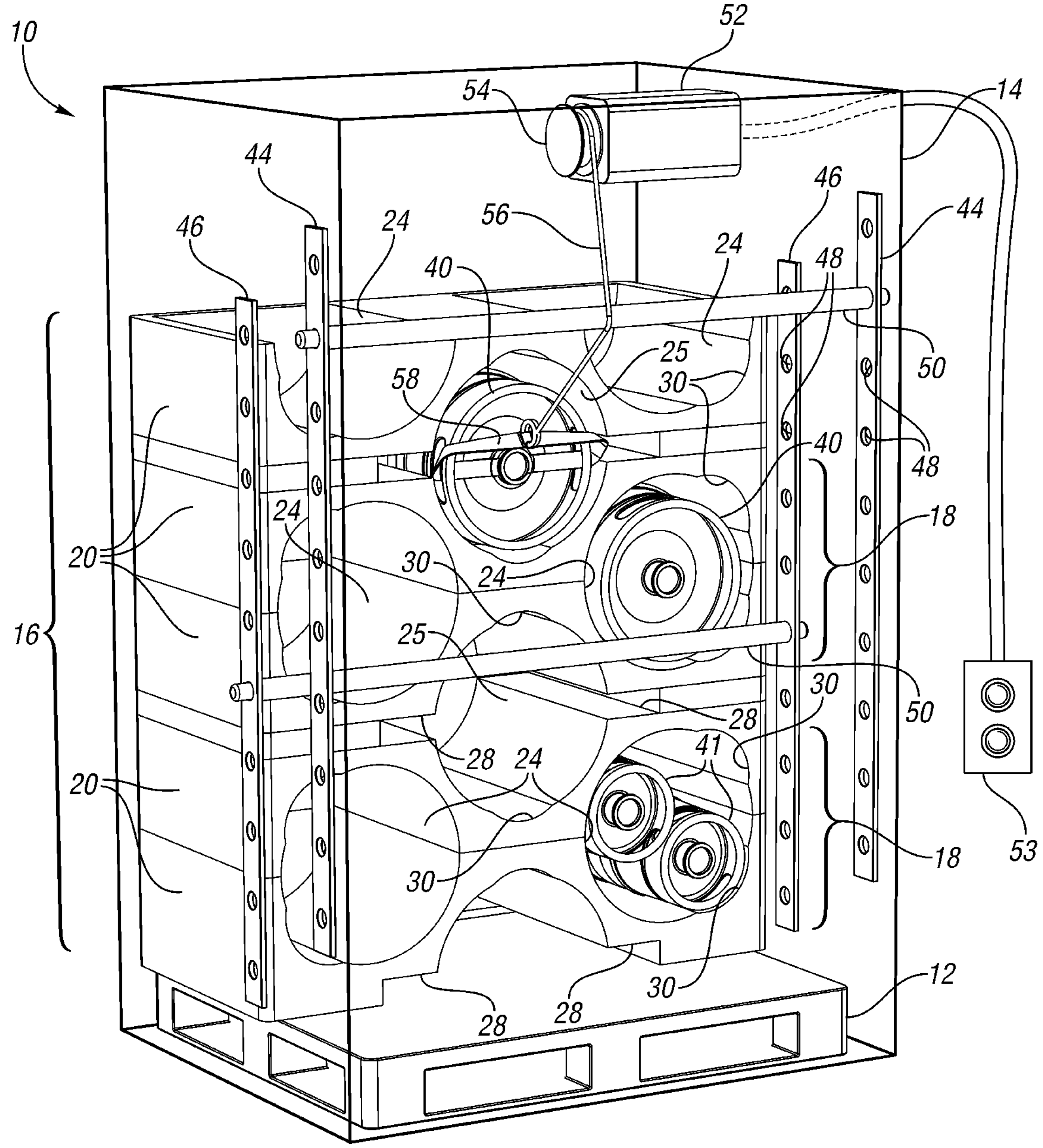
FIG. 1 is a keg delivery system according to one embodiment.

One embodiment of a delivery system 10 for beer kegs 40, sixth-barrels 41, quarter-barrels, other size beer containers or other similar containers is shown in FIG. 1. The delivery system 10 is shown in a truck bay 14 of a delivery truck. The delivery system 10 includes a rack 16 installed in the bay 14. The rack 16 includes a plurality of tiers 18 that could be stacked on a pallet 12, or simply stacked on the floor of the truck bay 14. Each tier 18 includes an upper half 20 and a lower half 20, which may be identical. In this example, each half 20 is molded a single piece of plastic, such as by injection molding or rotomolding or each half 20 could be formed from twin-sheet thermoforming. One half 20 is flipped vertically relative to the other before the two halves 20 are stacked to form a tier 18. The stacked halves 20 define a plurality of container-receiving bays 24, where each half 20 defines half of the container-receiving bay 24. Each half 20 may also define half of another container-receiving bay 25 together with a half 20 in an adjacent tier 18. Each half 20 further includes a pair of recesses 28, which when aligned with the recesses 28 of an adjacent half 20 in an adjacent tier 18 form openings for receiving the tines of a forklift. The container-receiving bays 24, 25 may include lobes 30, e.g. portions of small, offset radius, for accommodating multiple sixth-barrels 41.

Figure 2:
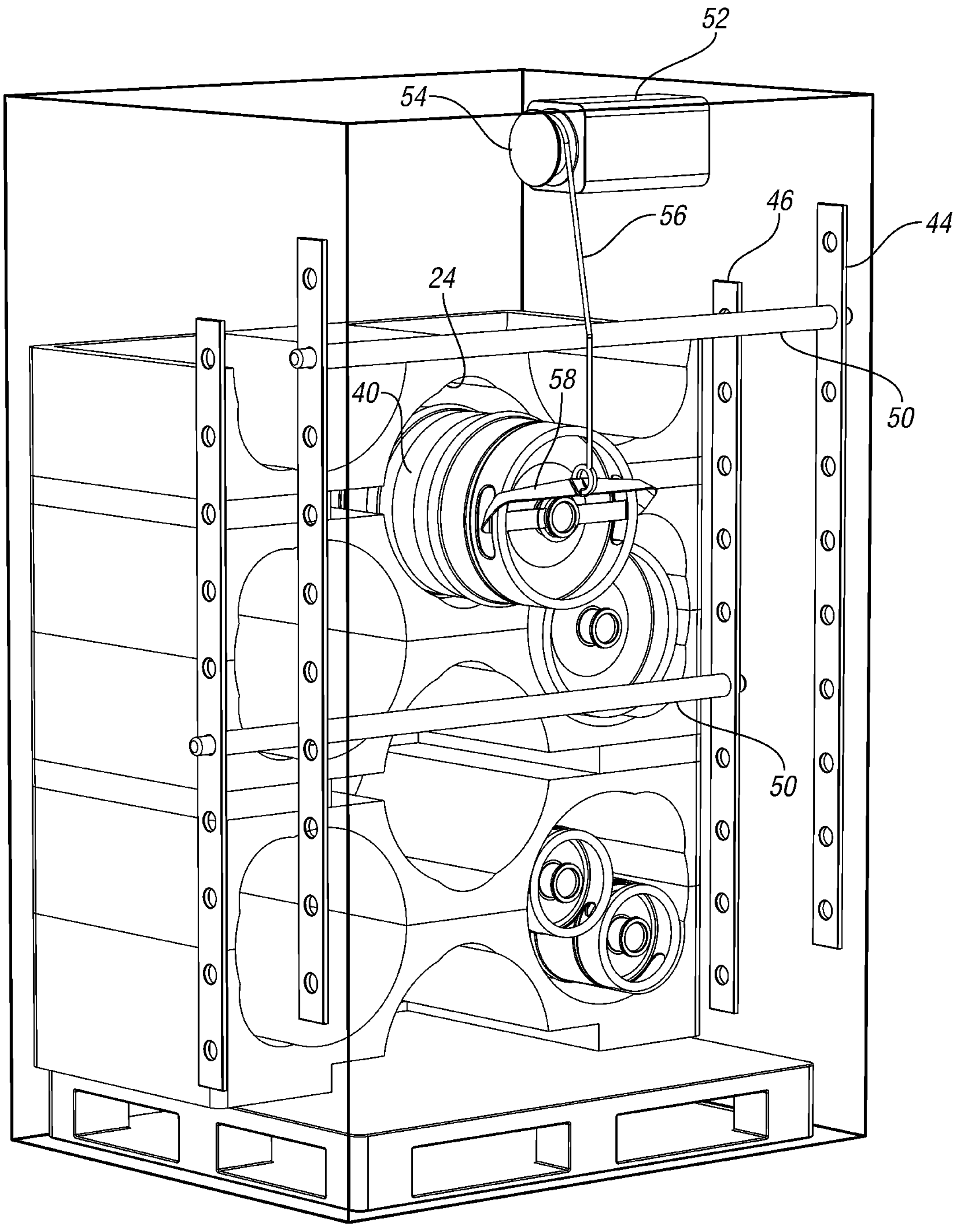
FIG. 2 shows the keg delivery system of FIG. 1 with a keg being drawn out of the rack.

A pair of forward brackets 44 are spaced in front of and offset upward relative to a pair of rear brackets 46. Each of the brackets 44, 46 includes a plurality of vertically spaced openings 48. The brackets 44, 46 are mounted to the walls of the truck bay 14. Bars 50 are selectively mountable at various heights in the openings 48 of the brackets 44, 46. As shown, bars 50 in the rear brackets 46 can be used to keep the rack 16 in place in the truck bay 14. Bars 50 in the forward bracket 44 provide a forward routing point that can be used to direct a cable 56 for pulling a keg 40 out of the bay 24. A cable 56 is operated by a motor 52 (such as an electric motor, pneumatic motor, hydraulic motor, etc.) driving a spool 54 about which the cable 56 is wound and unwound. The cable 56 can be wire, rope, braid or any suitable filament. The motor 52 and spool 54 may be mounted to a track on the ceiling of the truck bay 14. The cable 56 is selectively attached to a strap assembly 58 on a keg 40. The motor 52 is controlled by a user-operated switch 53 (optionally, the switch may be provided wirelessly). By directing the cable 56 around the bar 50, the cable 56 pulls the keg 40 in a horizontal direction out of the bay 24, as shown in FIG. 2.

Figure 3:
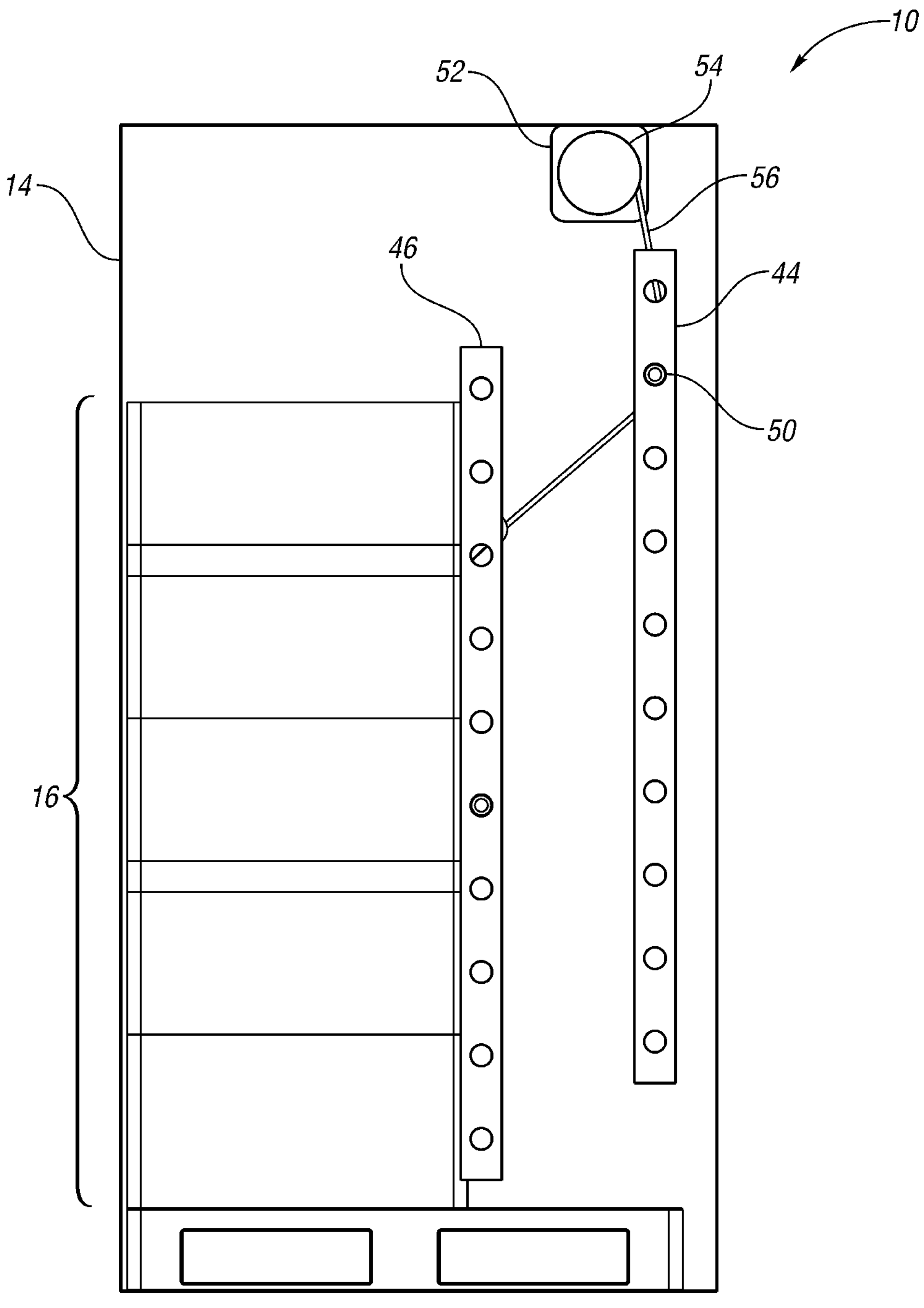
FIG. 3 is a side view of the system of FIG. 1.
Figure 4:
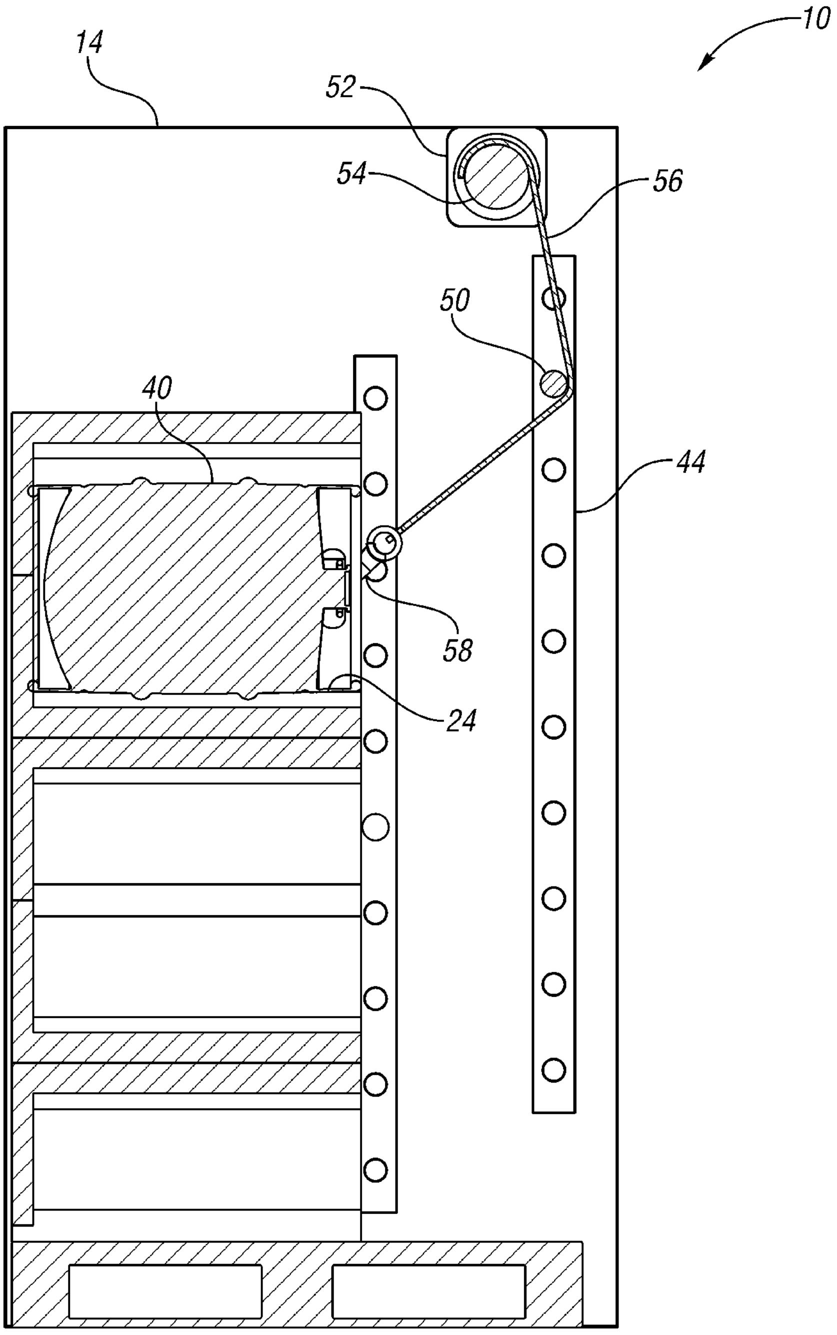
FIG. 4 is a section view of the keg delivery system of FIG. 3.

As shown in FIGS. 3 and 4, the bar 50 in the forward bracket 44 redirects the cable 56 such that much of its force is directed horizontally out of the bay 24. The bar 50 can rotate in openings 48 when cable 56 is actuated, thereby reducing friction/wear at the contact areas of bar 50 and cable 56.

Figure 5:
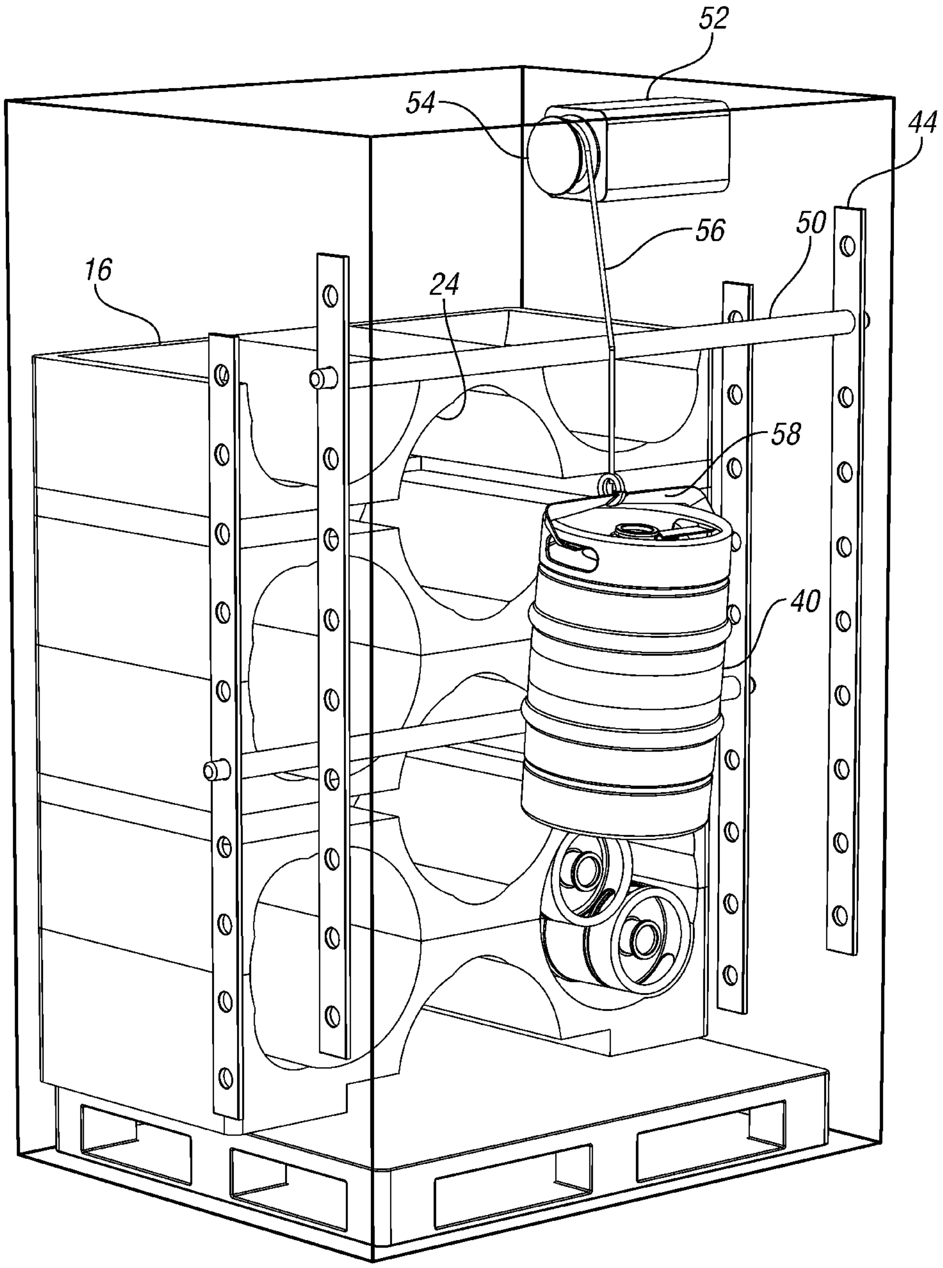
FIG. 5 shows the keg delivery system of FIG. 1 after the keg has been removed from the rack.
Figure 6:
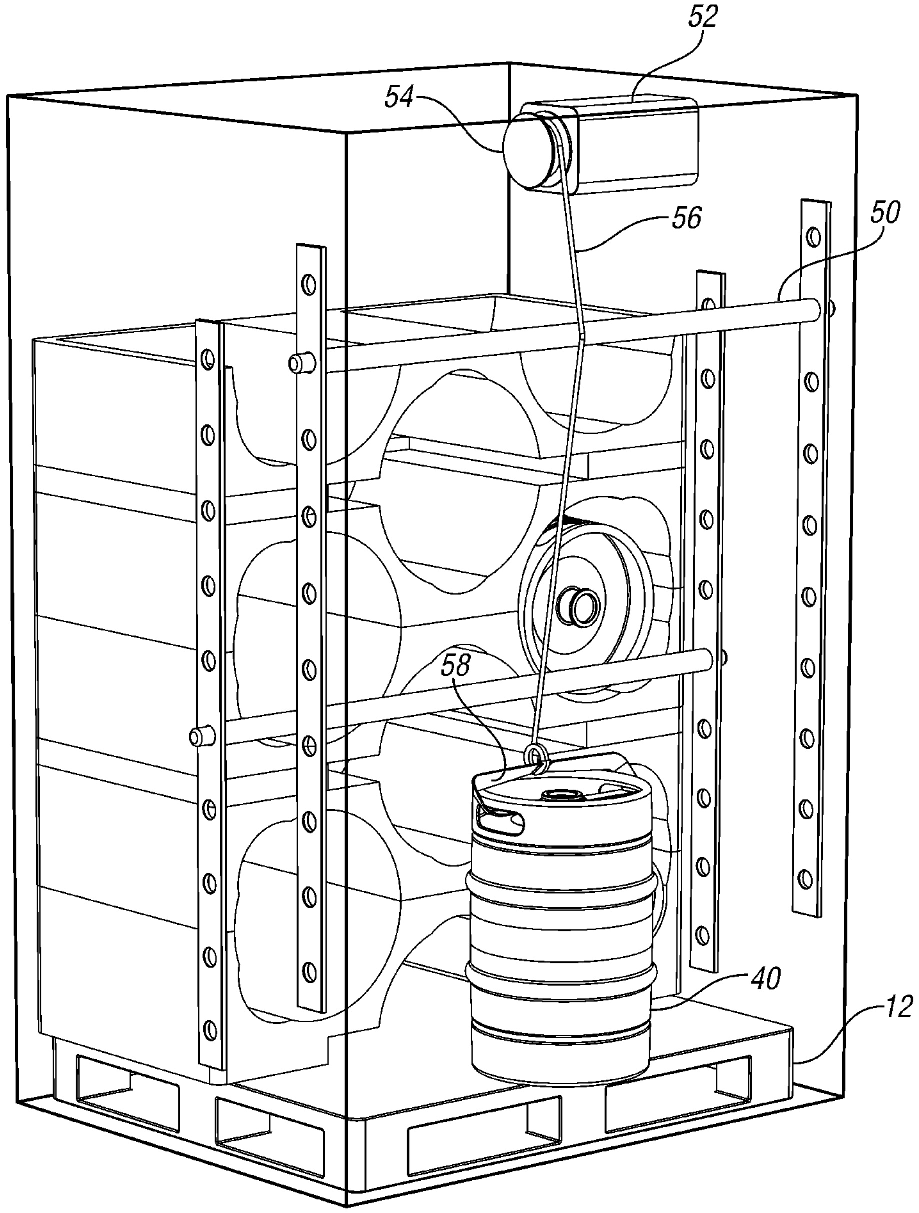
FIG. 6 shows the keg delivery system of FIG. 5 after the keg has been lowered.

As shown in FIG. 5, once the keg 40 is completely removed from the bay 24, the keg 40 is suspended by the cable 56 and strap assembly 58 in a position spaced away from the rack 16. By then reversing the motor 52 via a switch (not shown), the keg 40 can then be lowered onto the floor or pallet 12, as shown in FIG. 6. The keg 40 can then be removed from the strap assembly 58 and delivered to the customer.

Figure 7:
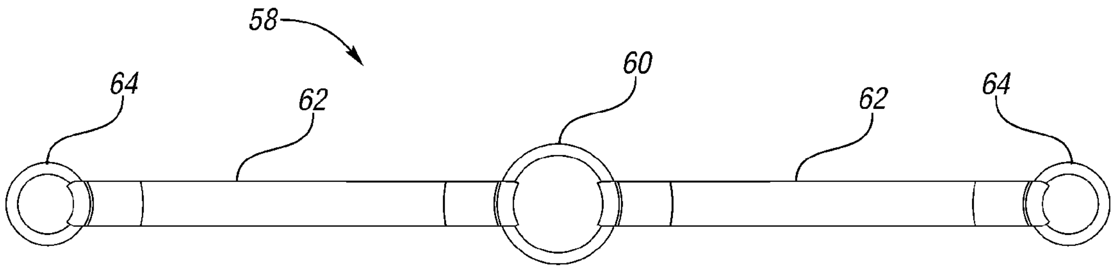
FIG. 7 is a top view of the strap assembly of FIG. 1.
Figure 8:
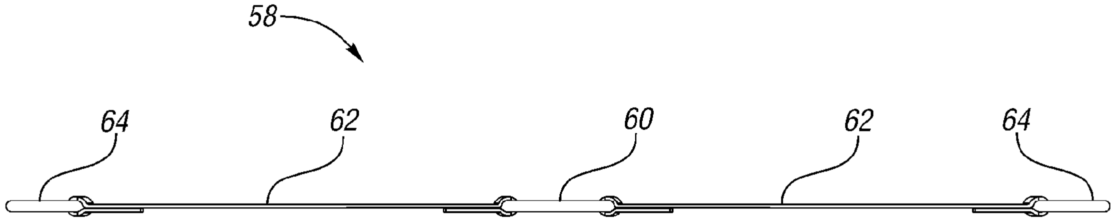
FIG. 8 is a side view of the strap assembly of FIG. 7.
Figure 9:
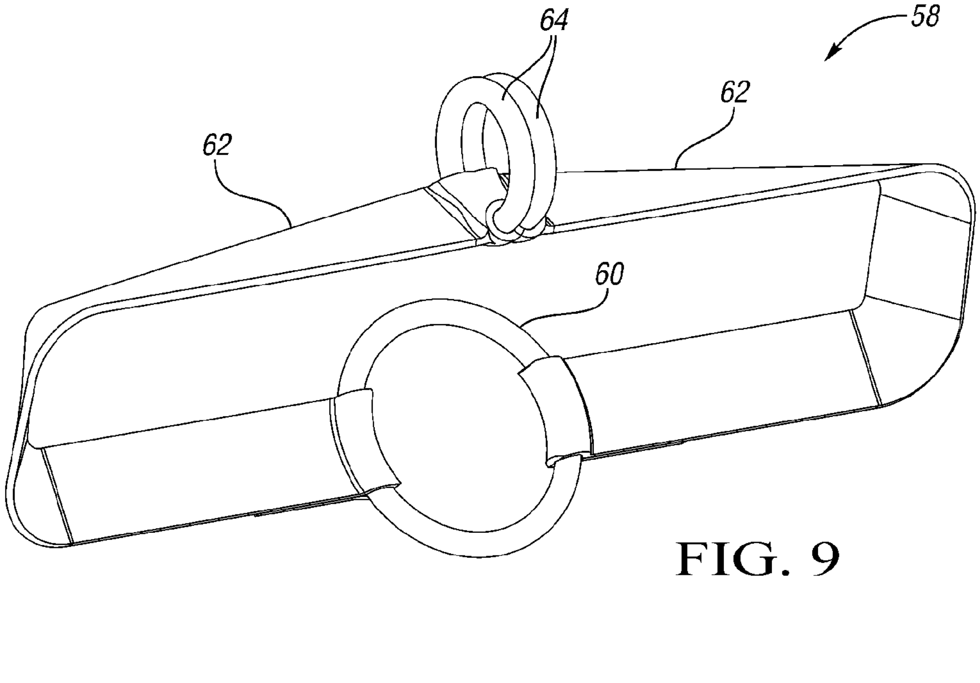
FIG. 9 shows the strap assembly of FIG. 7 in its arrangement for use.

The strap assembly 58 is shown in more detail in FIGS. 7-9. The strap assembly 58 includes a center ring 60 having two strap portions 62 secured to opposite sides thereof. Outer ends of the strap portions 62 are secured to connecting rings 64. The strap portions 62 can be any strong, flexible material, such as canvas, leather, nylon, or other suitable materials. The ring 60 and connecting rings 64 may be metal or a strong polymer or composite. Alternatively, the connecting rings 64 can be replaced with a flexible material or loops formed in the strap portions 62.

Figure 10:
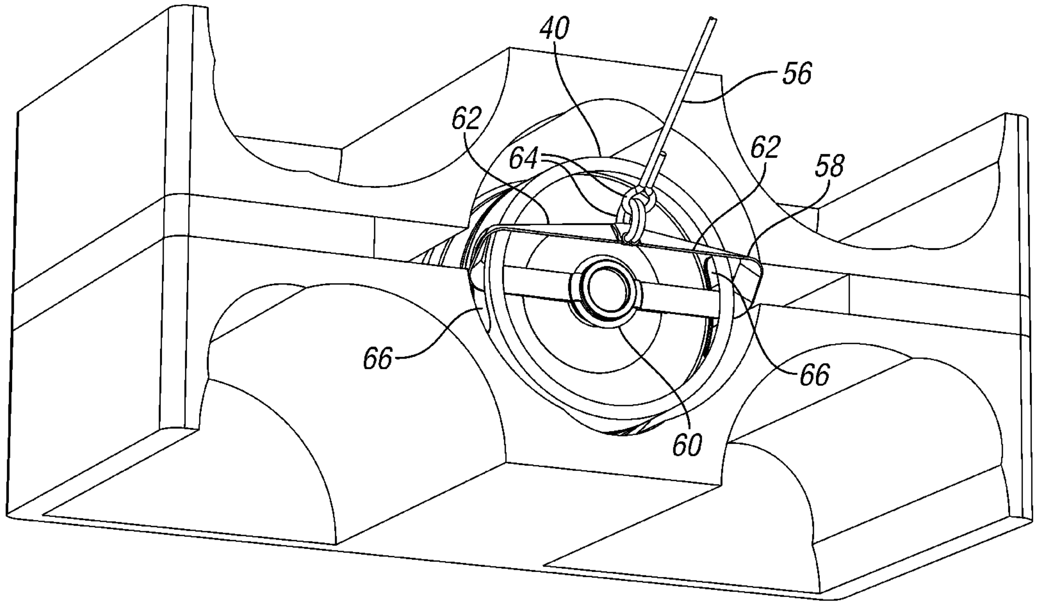
FIG. 10 is an enlarged view of a portion of FIG. 1 showing the connection to the keg.

Referring to FIG. 10, the strap assembly 58 can be attached to the keg 40 by placing the ring 60 over the neck or valve of the keg 40 and looping the strap portions 62 through handle openings 66 in the keg 40. The connecting rings 64 are brought together and connected to the cable 56 over the ring 60.

Figures 11, 12, 13:
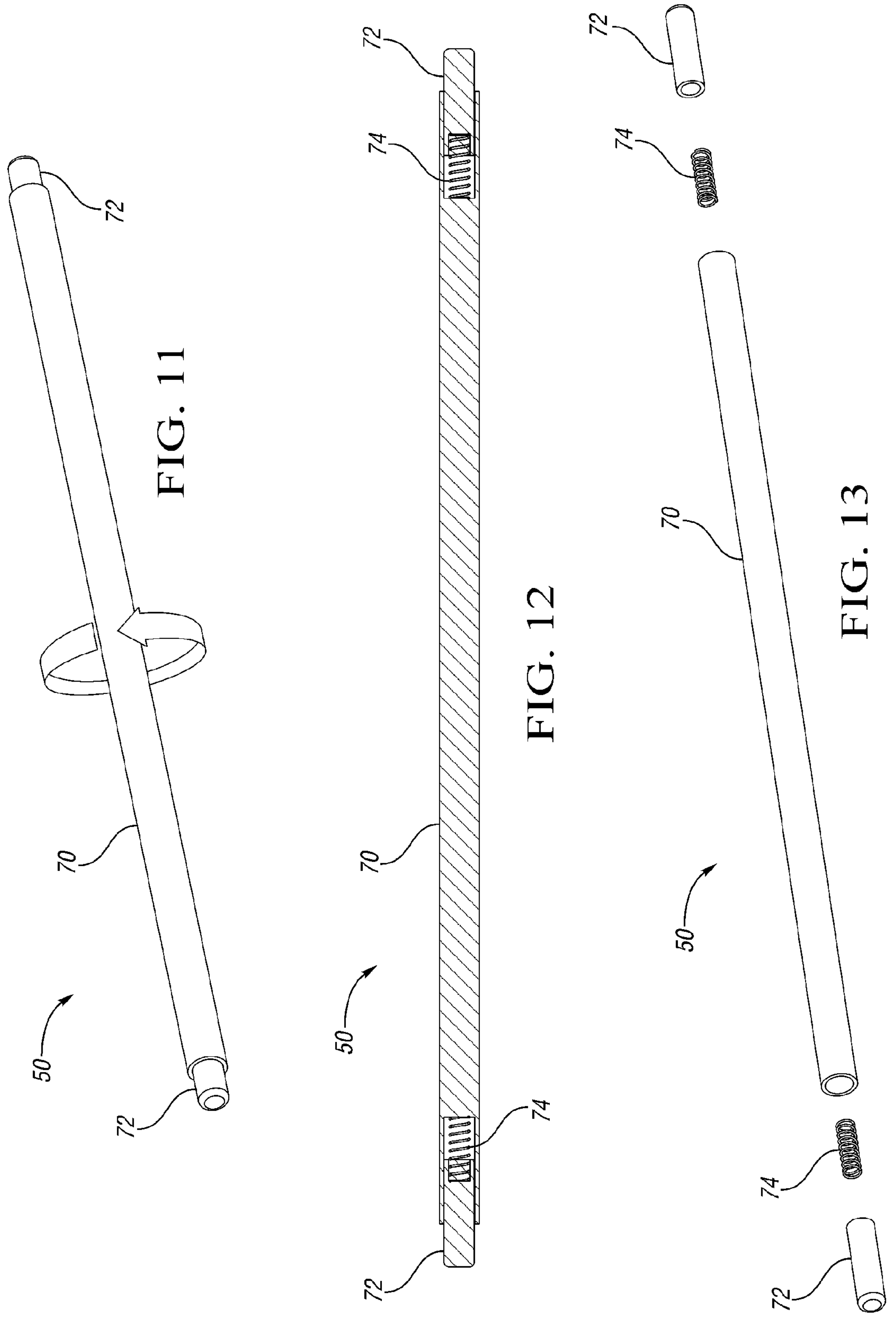
FIG. 11 is a perspective view of one of the bars of the keg delivery system of FIG. 1.
FIG. 12 is a section view through the bar of FIG. 11.
FIG. 13 is an exploded view of the bar of FIG. 11.

The bar 50 is shown in more detail in FIGS. 11-13. The bar 50 includes a center portion 70, which may be solid steel or aluminum or other suitable material, with hollow ends into which pins 72 are inserted and biased outwardly by a spring 74. The center portion 70 may be rotatable relative to the pins 72.

Figure 14:
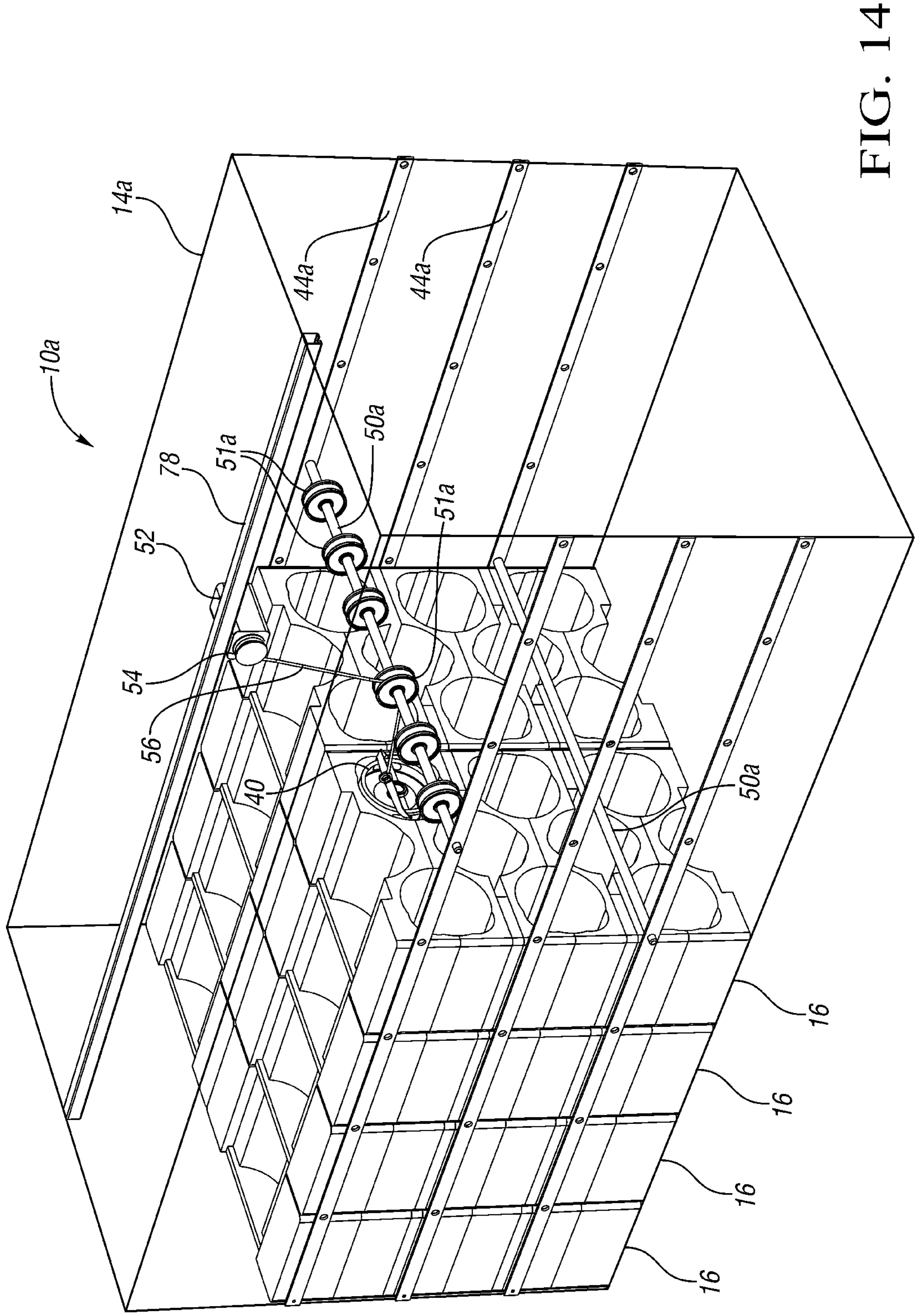
FIG. 14 shows a keg delivery system according to another embodiment.

A keg delivery system 10*a* according to another embodiment is shown in FIG. 14. In this embodiment, a plurality of racks 16 are stacked one in front of the other in a truck bay 14*a*. The motor 52 and pulley 54 may be mounted slidably on a track 78 extending the length of the bay 14*a*. The brackets 44*a* in this embodiment are oriented horizontally, but a plurality of brackets 44*a* are mounted at multiple heights. This provides the ability to mount the bar 50*a* at any of a plurality of heights in front of each of the racks 16. The bars 50*a* can be moved in front of each rack 16 as the rack in front of it is emptied and removed. One bar 50*a* is mounted directly in front of the rack 16 to keep the rack 16 in place. The other bar 50*a* is spaced forward of the rack 16 for directing the cable 56. The forward bar 50*a* may include a plurality of pulleys 51*a* rotatably mounted at various locations along the length of the bar 50*a*. Alternatively, a single pulley 51*a* could be slidably and rotatably mounted on the bar 50*a*. The cable 56 extends from the spool 54 and then around the pulley 51*a* that is in front of the keg 40 to be removed from the rack 16.

Figure 15:
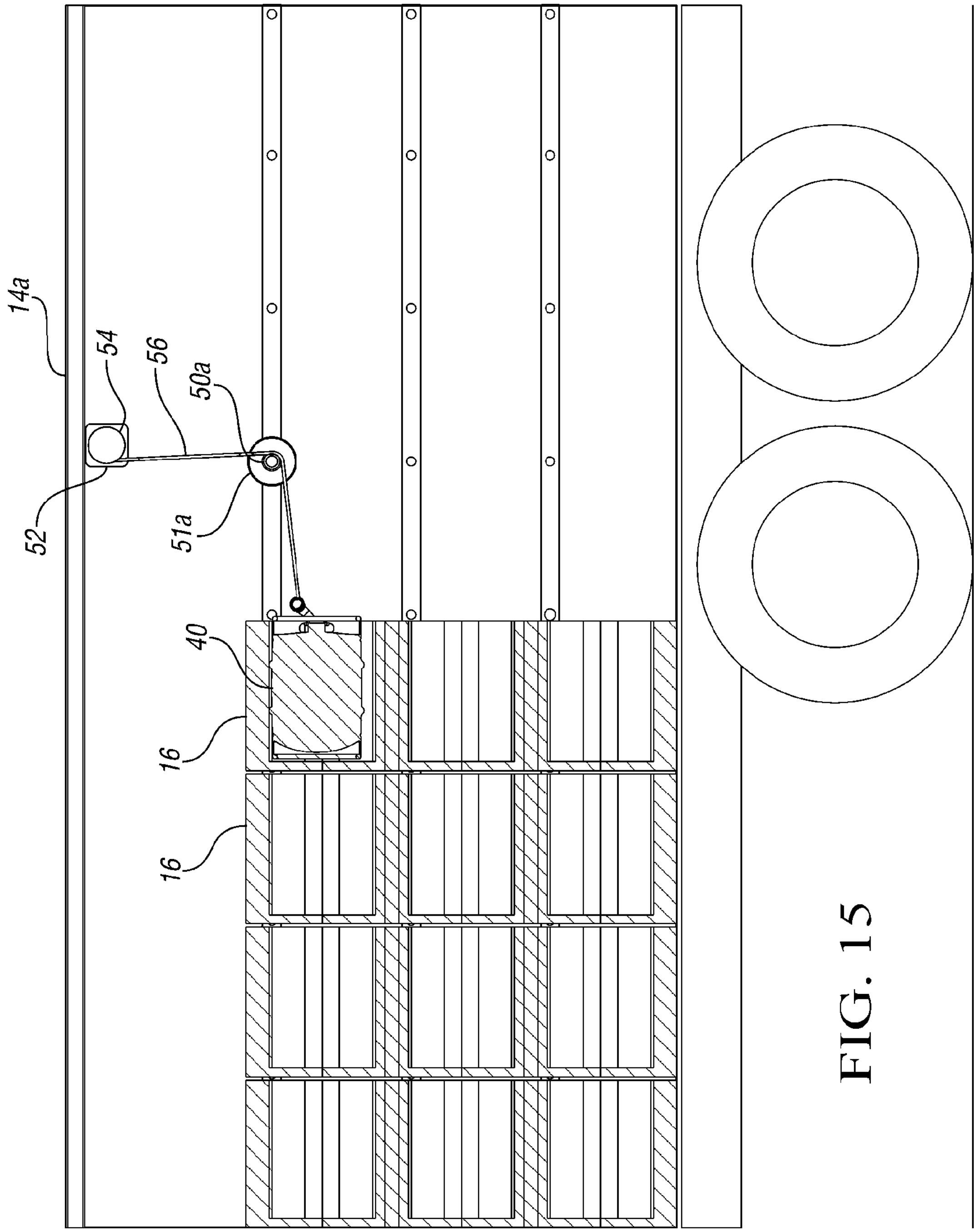
FIG. 15 is a section view through the keg delivery system of FIG. 14.

As shown in FIG. 15, the forward bar 50*a* and optional pulley 51*a* help direct the cable 56 such that most of its pulling force is in a horizontal direction and vertically aligned with the selected keg for removal.

Figure 16:
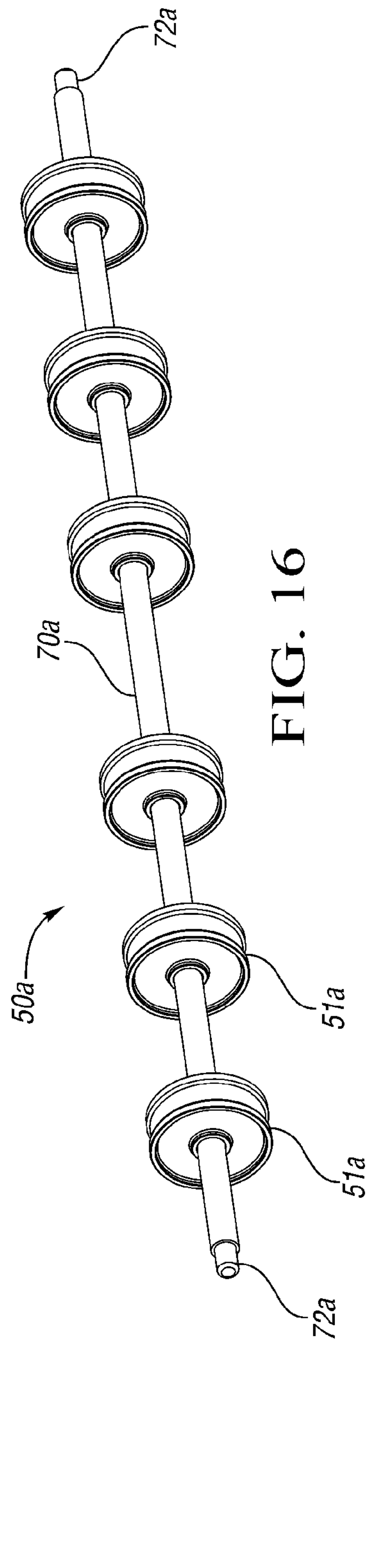
FIG. 16 is a perspective view of a bar that can be used in the system of FIG. 14.
Figure 17:
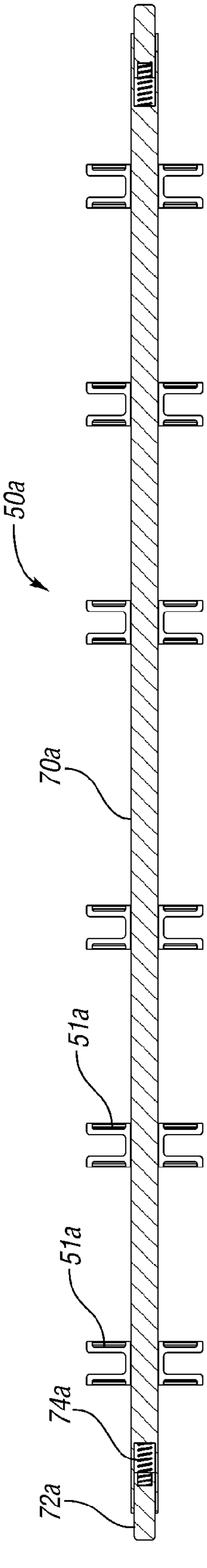
FIG. 17 is a section view through the bar of FIG. 16.
Figure 18:
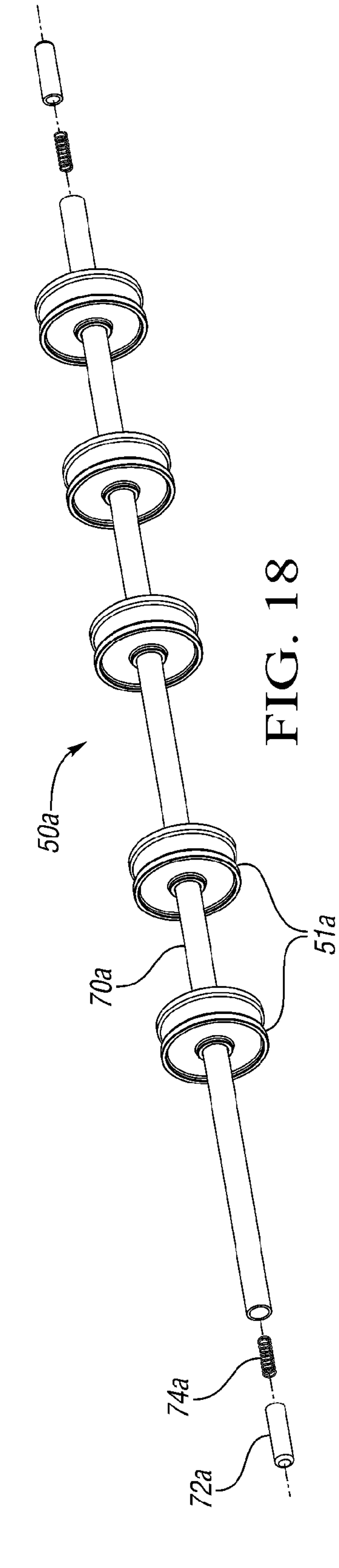
FIG. 18 is an exploded view of the bar of FIG. 16.
Figure 19:
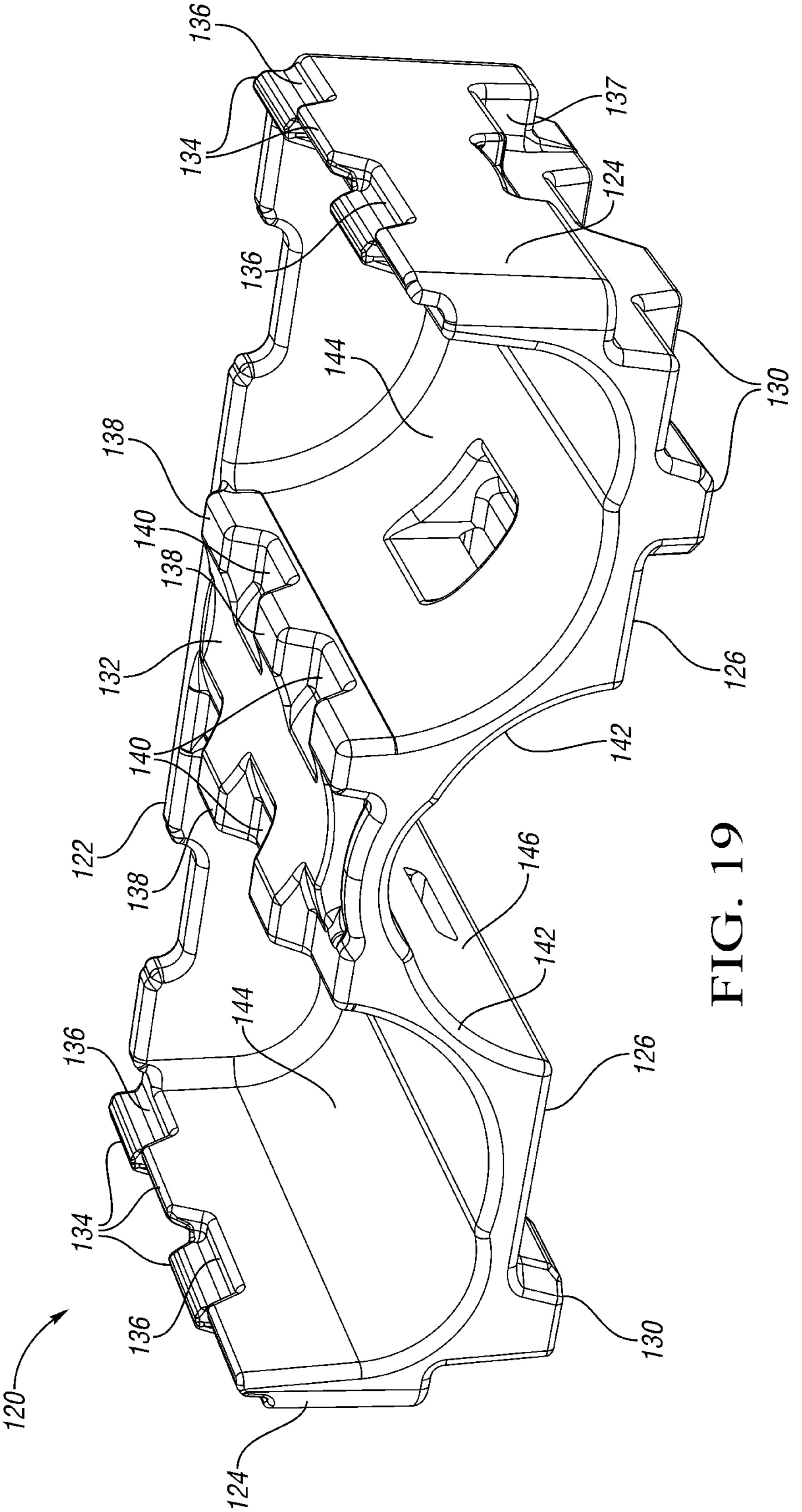
FIG. 19 is a perspective view of a rack tier half according to another embodiment.

The forward bar 50*a* is shown in more detail in FIGS. 16-18. The forward bar 50*a* includes a center portion 70*a* which, again, may be solid aluminum, steel or other material. Pins 72*a* are inserted into hollow ends of the center portion 70*a* and biased outwardly by springs 74*a*. The pulleys 51*a* are rotatably mounted on the center portion 70*a*.

FIGS. 19-30 show a keg rack half 120 according to another embodiment. The half 120 shown is molded as a single piece of plastic, such as by roto-molding, although with some modification, the half 120 could be injection molded. The half 120 includes a rear wall 122 and opposed side walls 124. The rear wall 122 and side walls 124 extend upward from a pair of spaced apart base walls 126. An upper wall 132 is generally centered between the base walls 126 and connected by angled walls 142. It should be noted that since the example half 120 shown is roto-molded, each of the walls 122, 124, 126, 132, 142 includes spaced apart wall stock (i.e., a double wall), which is formed in the roto-molding process.

A plurality of feet 130 extend downward from the base walls 126. The upper edge of each side wall 124 includes a plurality of upward projections 134 alternating with complementary recesses 136. The projections 134 alternate between the inner edge and the outer edge of the side wall 124 and the arrangement of projections 134 and recesses 136 on one side wall 124 is complementary to the arrangement on the other side wall 124.

The upper wall 132 includes a plurality of upward projections 138 alternating with complementary recesses 140. The upward projections and recesses 140 along one edge of the upper wall 132 is complementary to the arrangement of upward projections 138 and recesses 140 along the opposite edge. Between the side walls 124 and angled walls 142 are defined half bays 144 opening upward. Between the angled walls 142 is defined a half bay 146 opening downward.

A recess 137 is defined below each side wall 124 forward of the rear wall 122.

Figure 20:
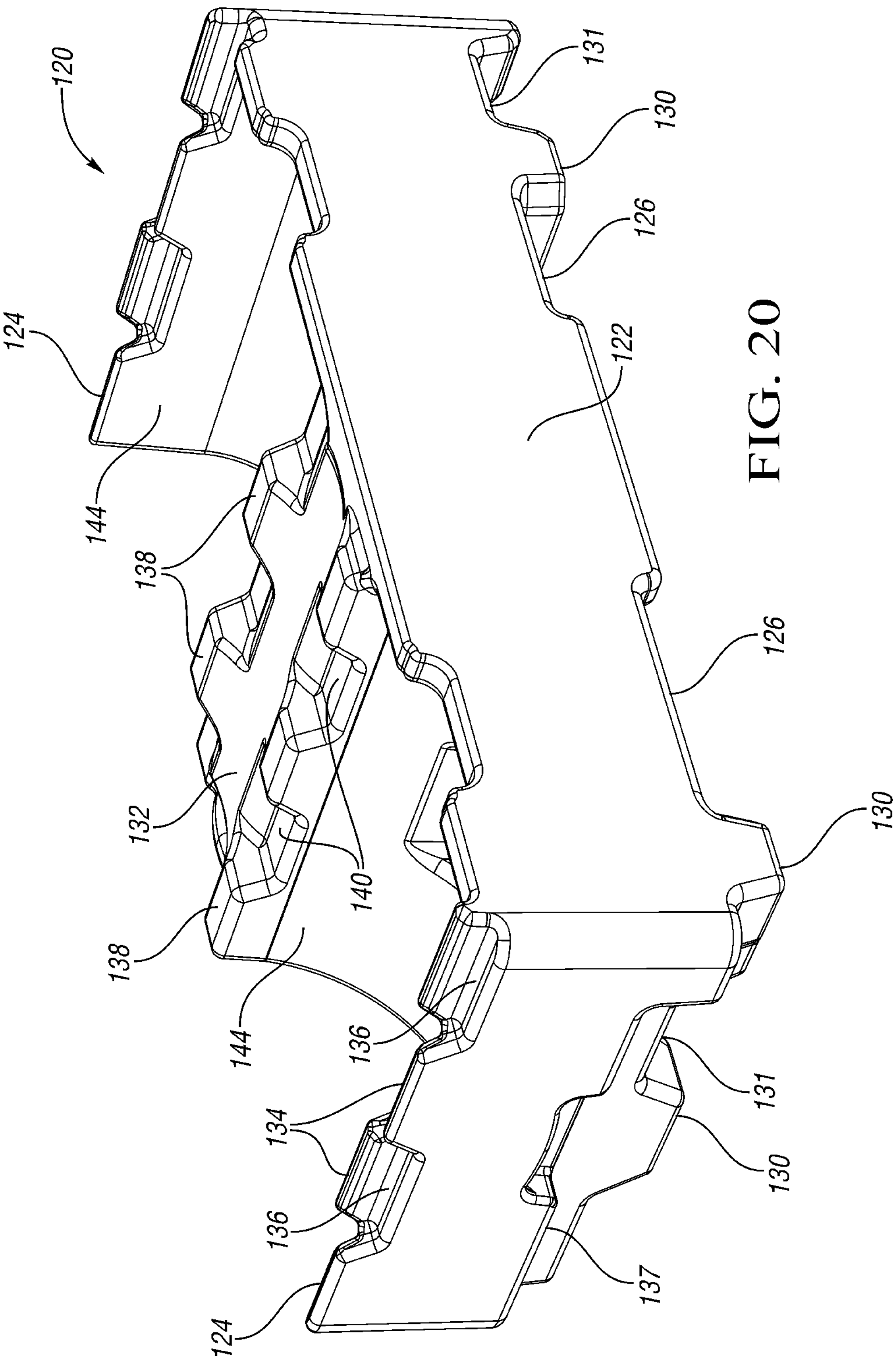
FIG. 20 is a rear perspective view of the half of FIG. 19.

FIG. 20 is a rear perspective view of the half 120. As shown, the feet project downward from the base walls 126 and are spaced with complementary recesses 131.

Figure 21:
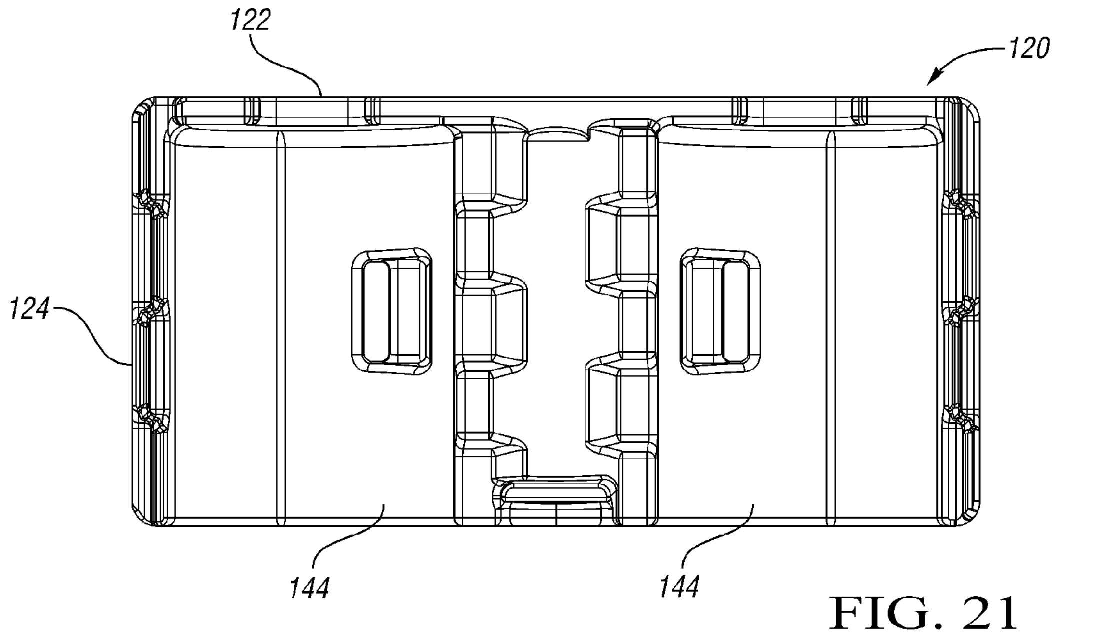
FIG. 21 is a top view of the half of FIG. 19.
Figure 22:
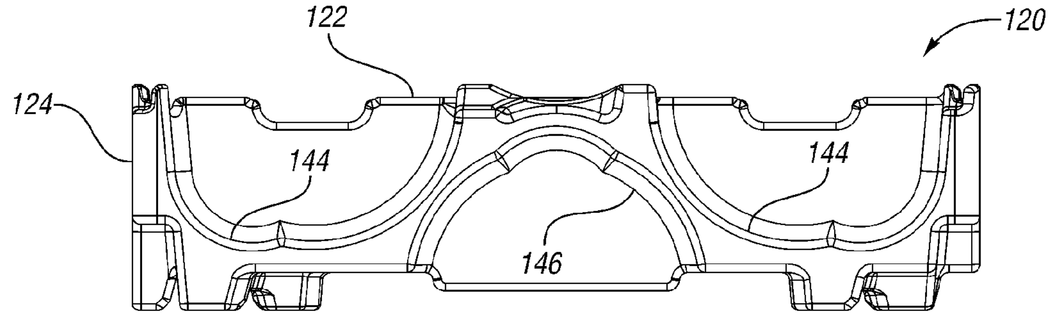
FIG. 22 is a front view of the half of FIG. 19.
Figure 23:
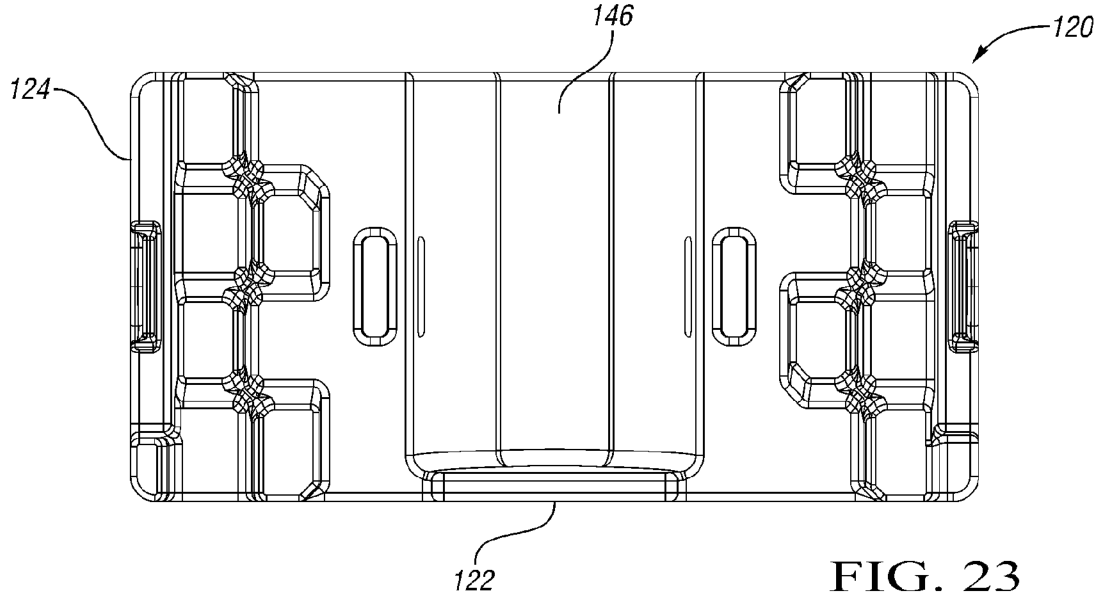
FIG. 23 is a bottom view of the half of FIG. 19.

FIG. 21 is a top view of the half 120. FIG. 22 is a front view of the half 120. FIG. 23 is a bottom view of the half 120.

Figure 24:
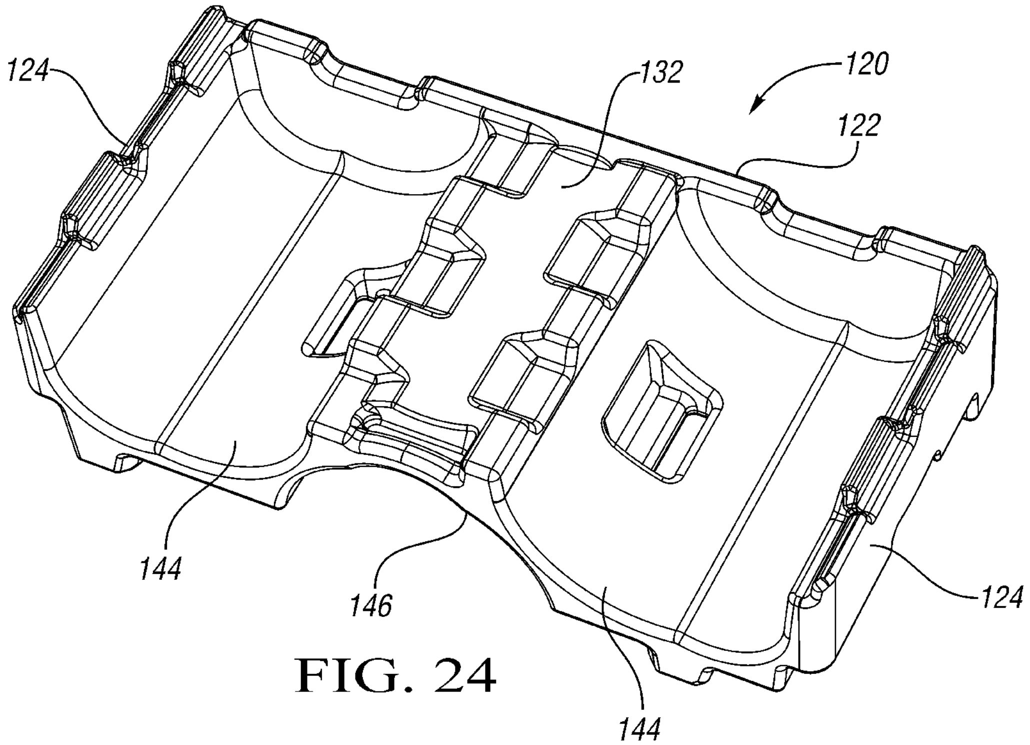
FIG. 24 is an upper perspective view of the half of FIG. 19.

FIG. 24 is an upper perspective view of the half 120.

Figure 25:
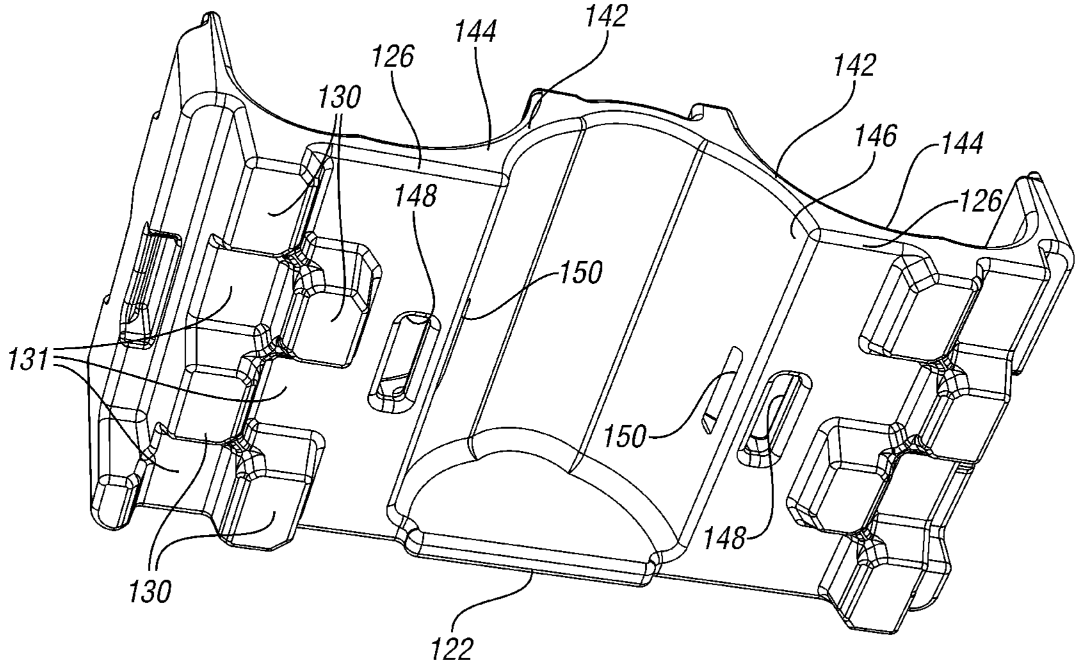
FIG. 25 is a bottom perspective view of the half of FIG. 19.

FIG. 25 is a bottom perspective view of the half 120. As shown, the feet 130 extend downward from the base walls 126 in an alternating arrangement with the recesses 131. The arrangement under one base wall 124 is complementary to the arrangement under the other base wall 126. Handle openings 148 are defined in each base wall adjacent an inner edge. Handle openings 150 are defined in each angled wall 142 adjacent a lower edge.

Figure 26:
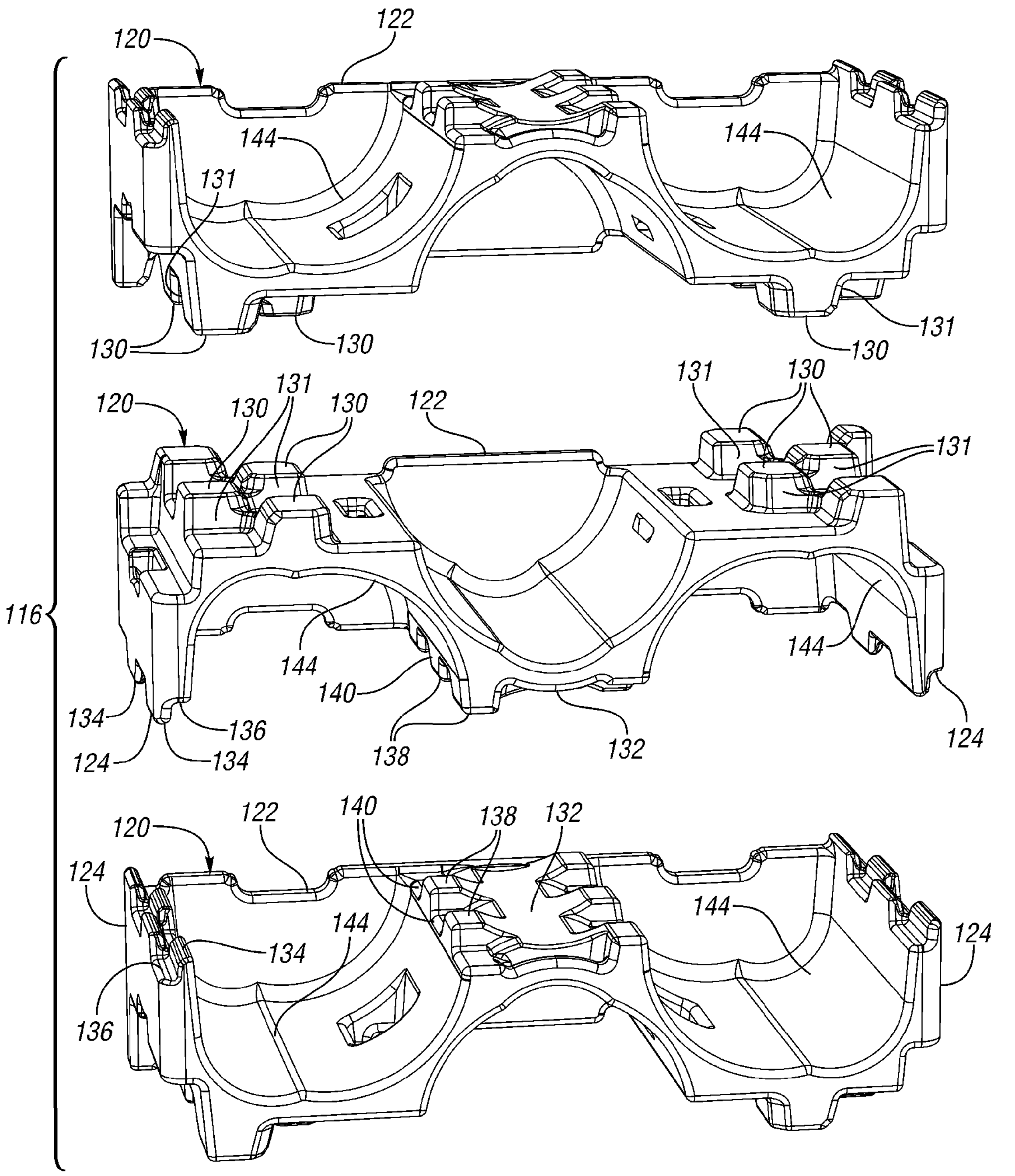
FIG. 26 is an exploded view of a rack including three of the halves of FIG. 19.

FIG. 26 shows three of the halves 120 in an exploded view of a portion rack 116. As shown, the bottom half 120 is arranged with the half bays 144 opening upward while the second half 120 is flipped so that the half bays 144 open downward. In this orientation, the arrangement of projections 134 and recesses 136 along the side walls of the lower half 120 are complementary to the arrangement of projections 134 and recesses 136 along the side walls of the second half 120. Similarly, the arrangement of projections 138 and recesses 140 on the upper wall 132 of the lower half 120 are complementary to the arrangement of projections 138 and recesses 140 on the upper wall 132 of the second half 120.

The third half 120 is also arranged with the half bays 144 opening upward. In this orientation, the feet 130 and recesses 131 are arranged in a complementary fashion to the feet 130 and recesses 131 of the second half 120.

Figure 27:
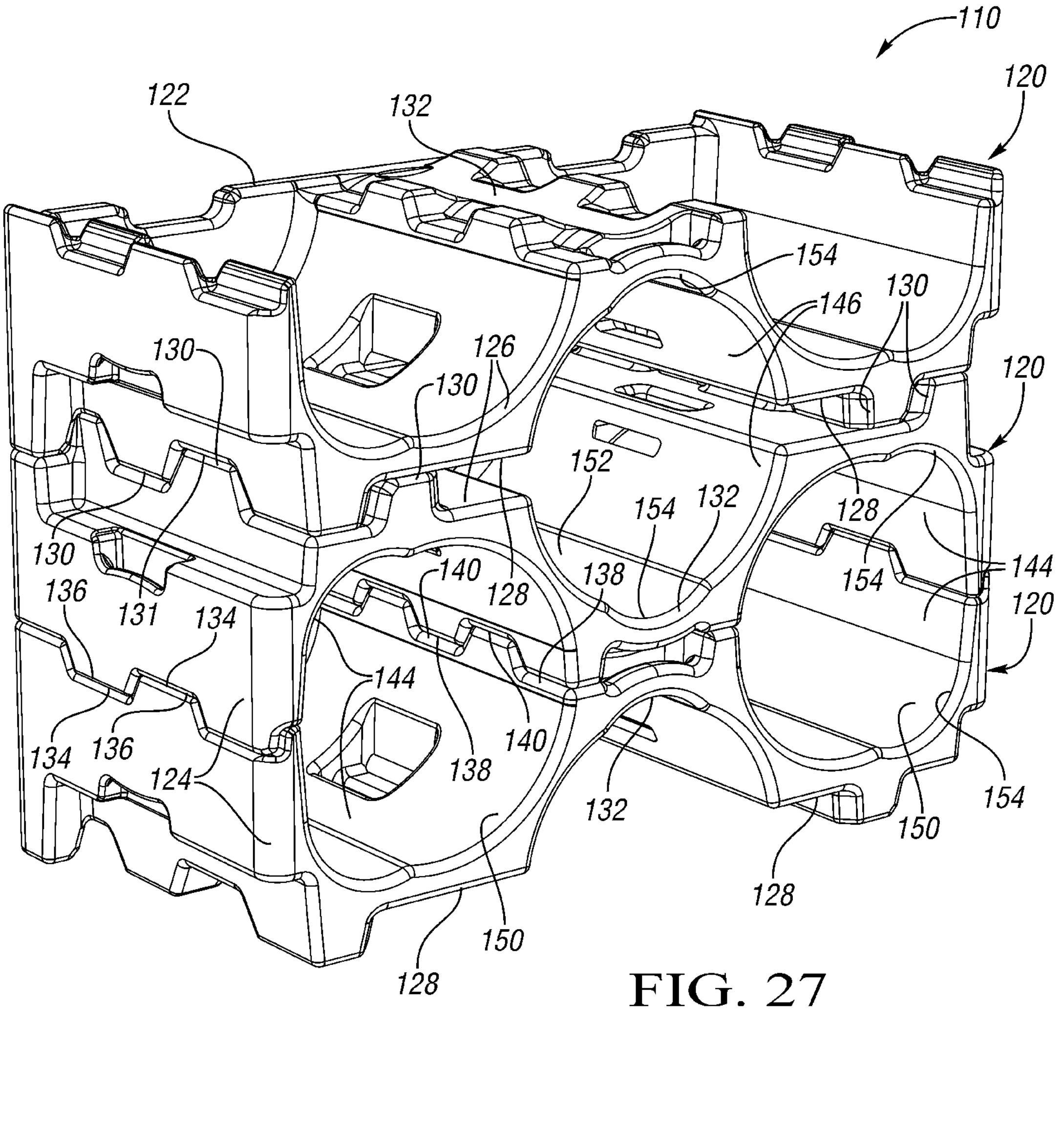
FIG. 27 is an assembled view of the halves of FIG. 26.

In FIG. 27, the three halves 120 of FIG. 26 are assembled. The projections 134 and recesses 136 along the side walls 124 of the lower half 120 and the second half 120 are interlocked, as are the projections 138 and recesses 140 of the upper walls 132 of the lower half 120 and second half 120. Further, the feet 130 and recesses 131 of the base walls 126 of the second half 120 and the third half 120 interlock. This provides a stable portion of a rack. The half bays 144 of the lower half 120 and the second half 120 open toward one another to define keg receiving bays 150. The half bays 146 of the second half 120 and the upper half 120 also face each other to define a keg receiving bay 153. As disclosed in the previous embodiment, the bays 150, 152 may include lobes 154. Between the upper half 120 and the second half 120, the offset feet 130 create a fork tine-receiving opening 128 between the base walls 126 of the two halves 120 on either side of the center bay 152. Further, the feet 130 of the lower half 120 define fork tine-receiving openings 128 below the base walls 126 above the floor. The openings 128 are the same height between the lower half 120 and the floor as between the upper half 120 and the second half 120.

Figure 28:
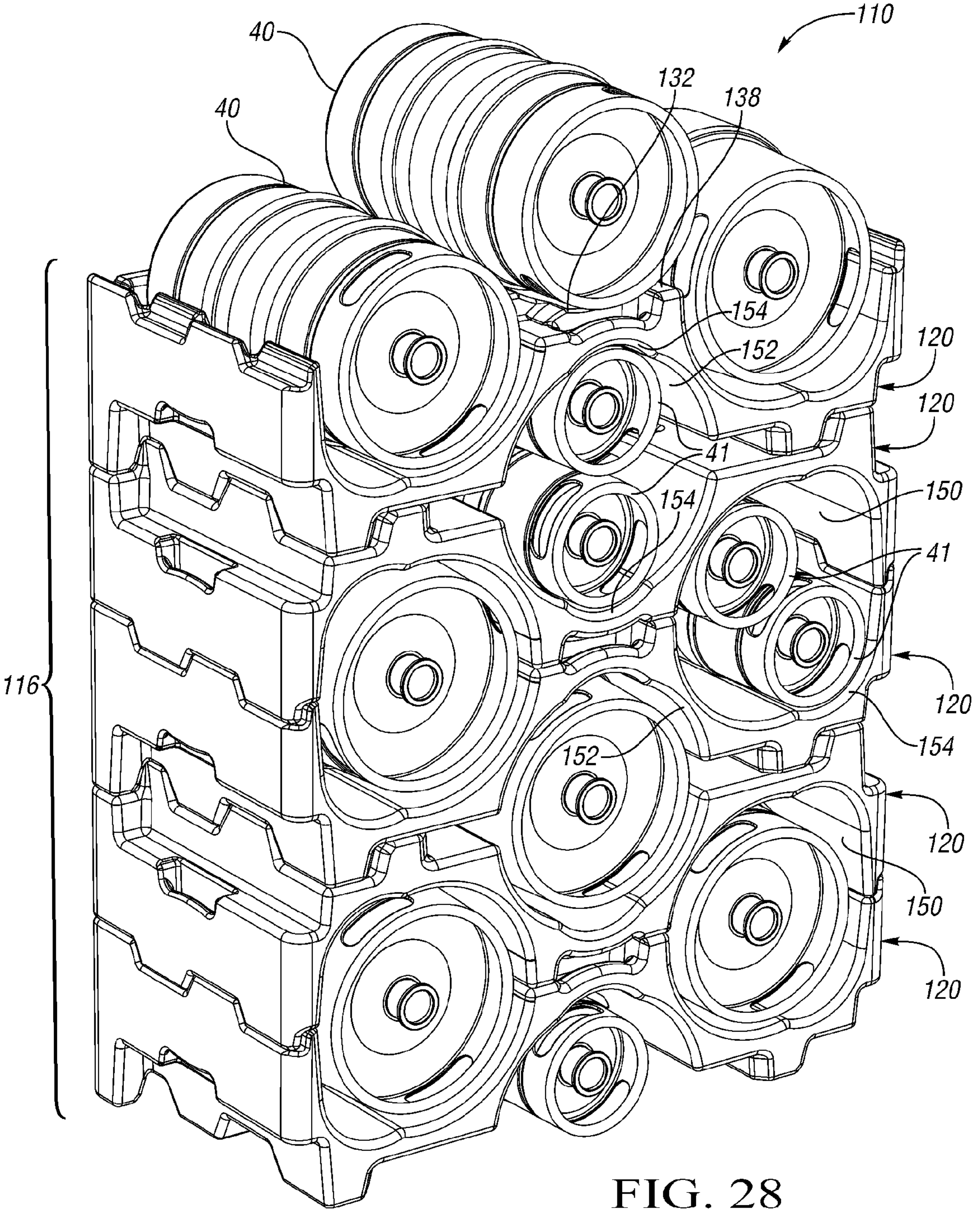
FIG. 28 is a perspective view of a rack assembled of a plurality of halves of FIG. 19 and loaded with kegs and sixth-barrels.

FIG. 28 shows an assembled keg rack 116 formed of a stack of five halves 120 arranged in the alternating fashion described above. The bays 150, 152 are loaded with kegs 40, and may be loaded with two sixth-barrels 41, aligned with the lobes 154. An uppermost keg 40 can be stacked on a concave portion of the upper wall 132 between the projections 138.

Figure 29:
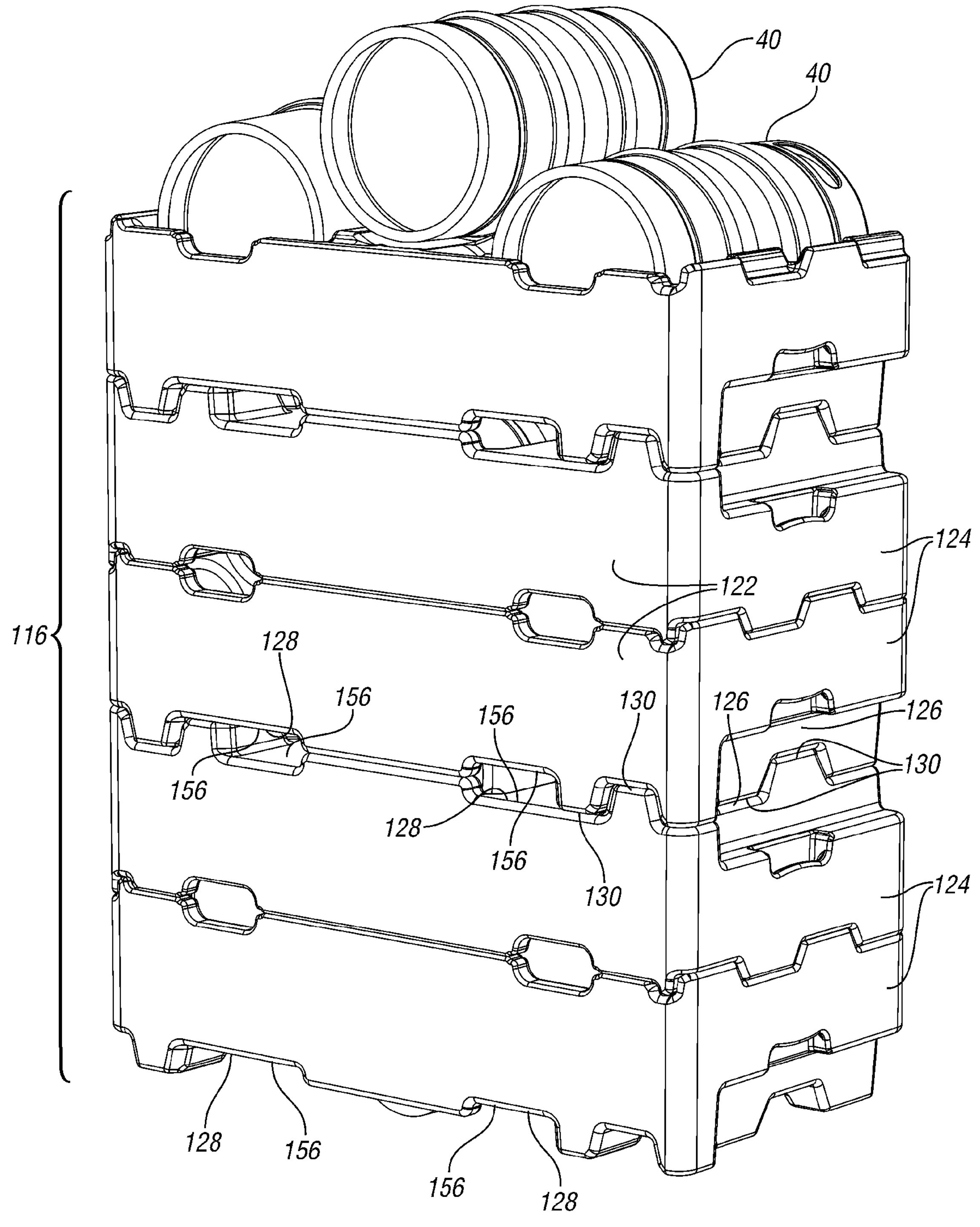
FIG. 29 is a rear perspective view of the rack of FIG. 28.

FIG. 29 is a rear view of the rack 116 of FIG. 28. As shown, the rear walls 122 of the halves 120 are aligned for weight transfer. Further, the side walls 124 are aligned for alternating pairs of halves 120. The other pairs of halves transfer weight via the feet 130 and bases 126. In this manner, multiple racks 116 can be assembled inside vehicles or at storage facilities and loaded with kegs 40, sixth-barrels 41 or other size containers. The rear walls 122 include recesses 156 at lower edges so that the fork-tine openings 128 are accessible from the rear of the stack. The rack 116 can be loaded and/or carried by a fork truck from either the front or rear of the rack 116.

Figure 30:
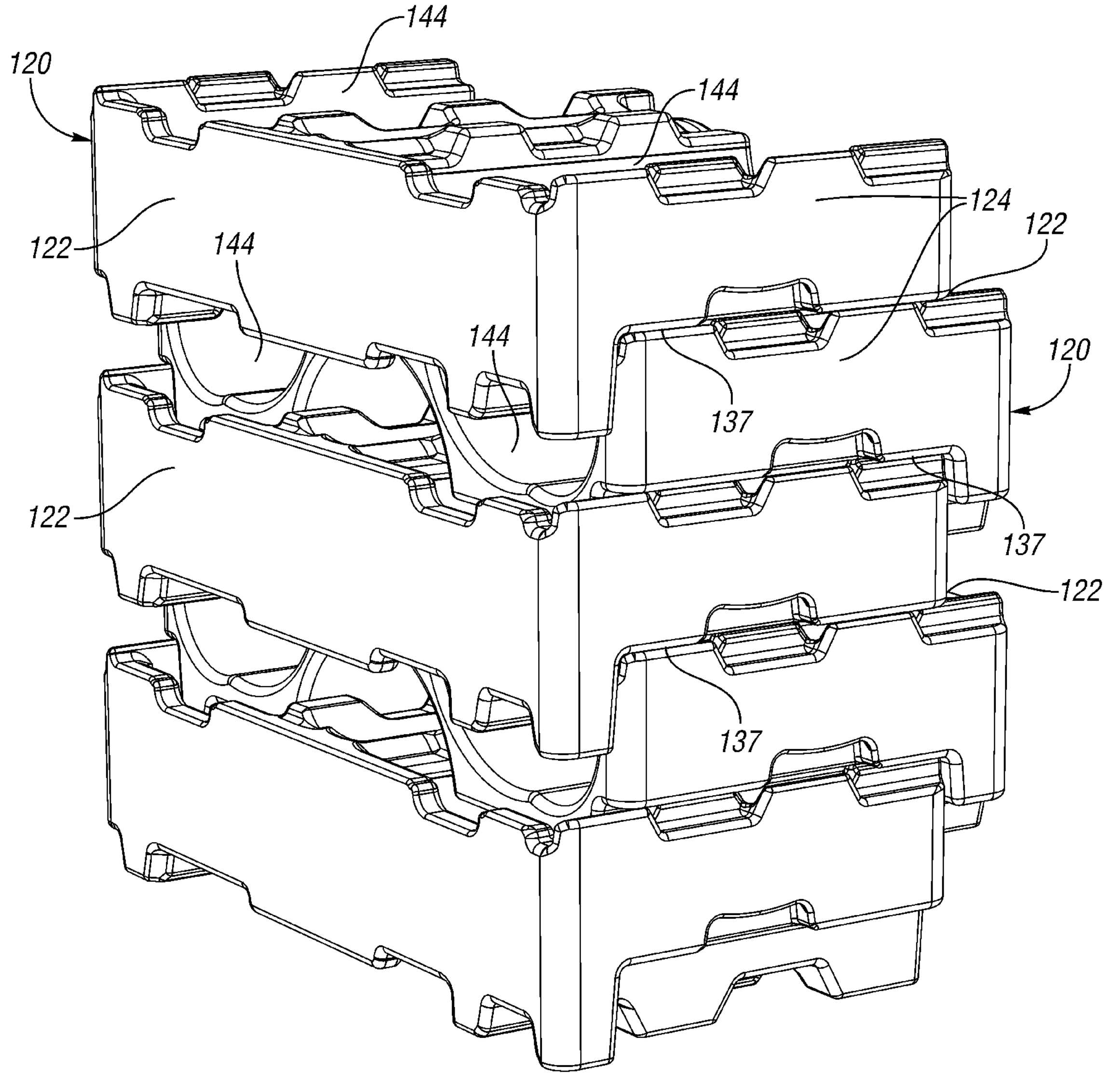
FIG. 30 shows a stack of the empty halves of FIG. 28.

When empty, the halves 120 can be rearranged and stacked as shown in FIG. 30 to reduce storage or shipping volume. In FIG. 30, all of the halves 120 are oriented with the bays 144 opening upward, but alternating halves 120 are rotated about a vertical axis such that the rear walls 122 in adjacent halves 120 are on opposite sides of the stack. The halves 120 are offset rearwardly of one another such that the side walls 124 can be received in the recess 137 below the side wall above.

Figure 31:
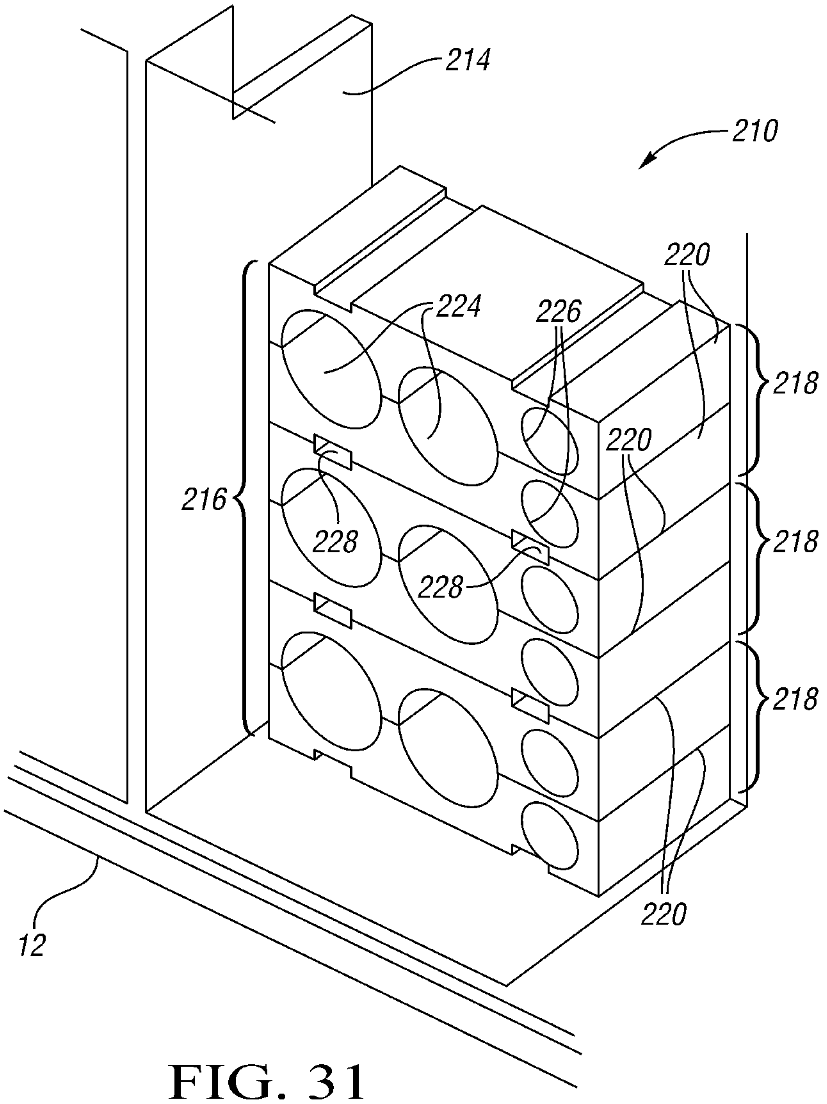
FIG. 31 shows a delivery system according to another embodiment.

Another embodiment of a delivery system 210 for beer kegs or other similar containers is shown in FIG. 31. The delivery system 210 is shown installed in a bay 214 of a delivery truck 212. The delivery system 210 includes a rack 216 installed in the bay 214. The rack 216 includes a plurality of tiers 218. Each tier 218 includes an upper half 220 and a lower half 220, which may be identical. Each half 220 is molded a single piece of plastic. One half 220 is flipped vertically relative to the other before the two halves 220 are stacked to form a tier 218. The stacked halves 220 define a plurality of container-receiving bays 224, where each half 220 defines half of the container-receiving bay 224. Optionally, each half 220 may also define a smaller bay 226, such as for receiving a sixth barrel. Each half 220 further includes a pair of recesses 228, which when aligned with the recesses 228 of an adjacent half 220 in an adjacent tier 218 form openings for receiving the tines of a forklift.

Figure 32:
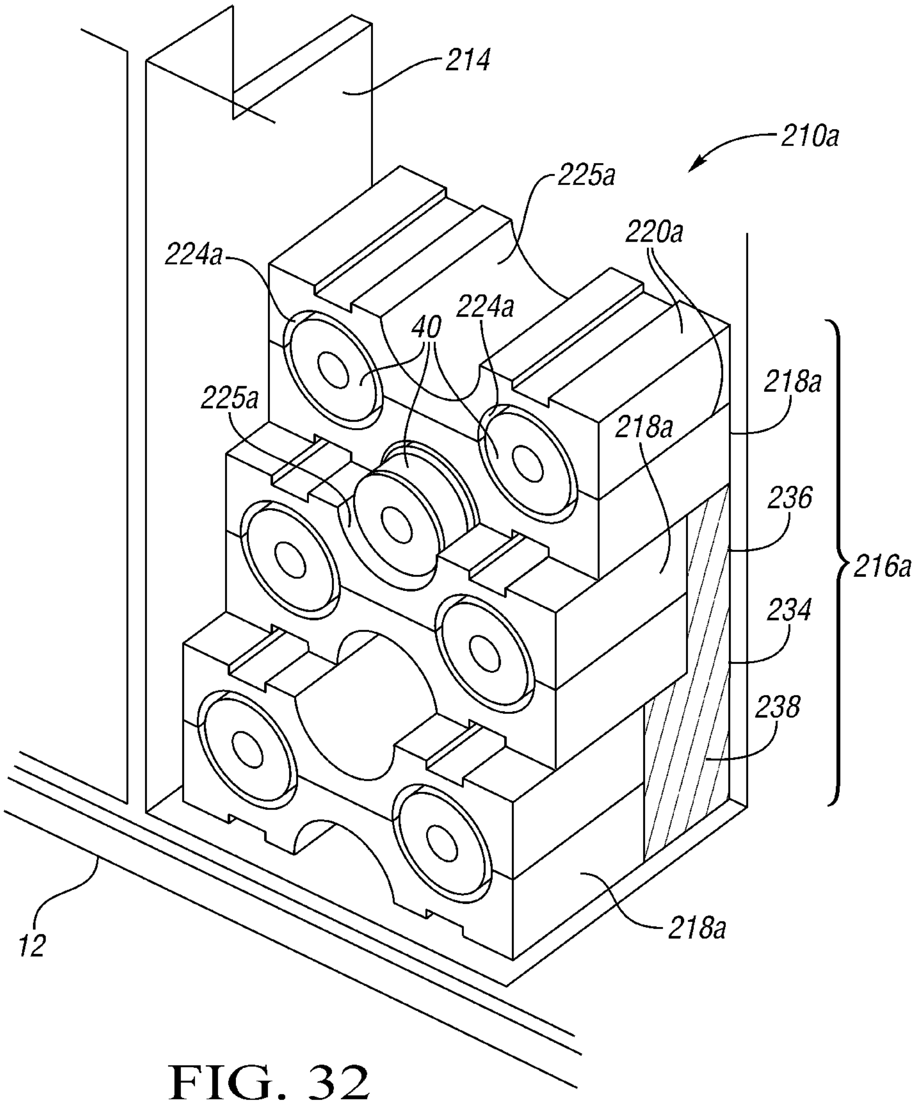
FIG. 32 shows a delivery system according to another embodiment.

FIG. 32 shows a delivery system **210*a* according to another embodiment. The delivery system 210*a* includes a rack 216*a* in the bay 214 of the truck 212. The rack 216*a* includes a plurality of tiers 218*a* each including a pair of halves 220*a* (which again, could be identical, but flipped). In this embodiment, each half 220*a* defines (one or more) half of a container-receiving bay 224*a* together with the other half 220*a* in its tier 218*a*. Each half 220*a* may also define half of another container-receiving bay 225*a* together with a half 220*a* in an adjacent tier 218*a*. In this embodiment, the tiers 218*a* are offset from one another by a spacer 234 in the bay 214. The spacer 234 includes a narrow upper section 236 aligned with the second tier and below the first tier 218*a*. The spacer 234 further includes a wider portion 238 aligned adjacent the third tier 218*a* below the second tier 218*a*, such that the first, second and third tiers 218*a* are offset from one another, with the third tier 218*a* toward the opening of the bay 214 relative to the second tier 218*a*, which in turn is forward of the first tier 218*a*. In this manner, a delivery person can step on the second and third tiers 218*a* as stairs to access kegs 240 in the upper bays 224*a***.

Figure 33:
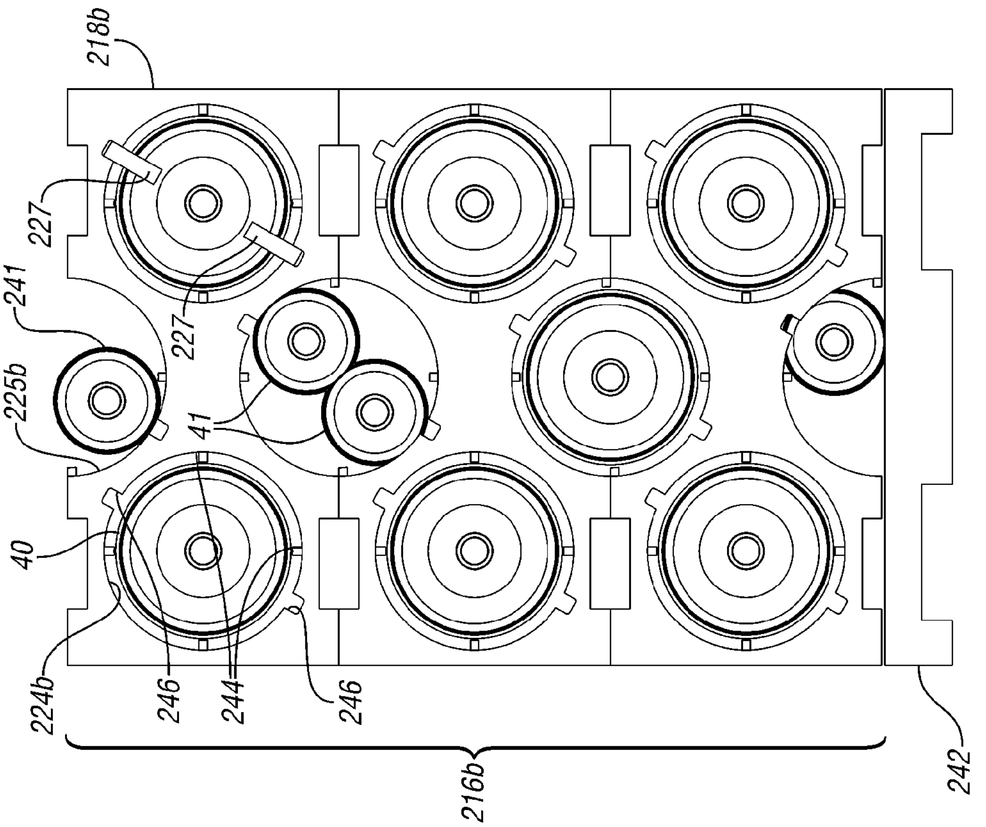
FIG. 33 shows a rack according to another embodiment.

FIG. 33 discloses a third rack **216*b* that could be used in the truck 212 and bay 214 of FIGS. 31 and 32. The rack 216*b* includes a plurality of tiers 218*b* (which could be formed in halves, as before). Each container-receiving bay 224*b* includes spacers or bumpers 244 on which the kegs 240 rest. Each container-receiving bay 224*b* further includes notches 246 for receiving an optional rotating locking mechanism 227 (two shown) for locking the kegs 240 in the bays 224*b*. As shown, between the bumpers 244, the bays 224*b* can each receive a pair of sixth barrels 241**.

Figure 34:
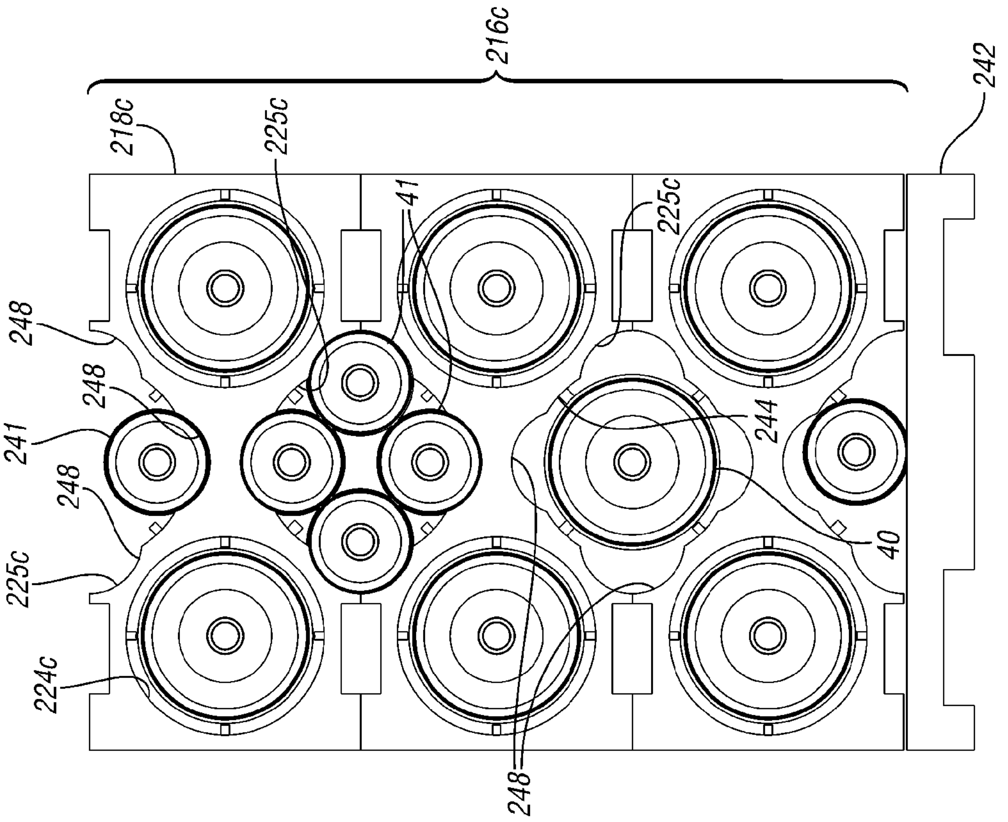
FIG. 34 shows a rack according to another embodiment.

FIG. 34 shows another embodiment of a rack **216*c*, which could be used in the truck 212 and bay 214 of FIGS. 31 and 32. The rack 216*c* includes a plurality of tiers 218*c* (again, which could be formed in halves). Each tier 218*c* includes a pair of container-receiving bays 224*c* defined within the tier 218*c* (e.g., between the halves). Additionally, each tier 218*c* defines half of a center container-receiving bay 225*c* together with the adjacent tier 218*c*. The center container-receiving bay 225*c* is clover leaf-shaped, in that it includes four enlarged portions or lobes between the bumpers 244 that can accommodate four sixth barrels 241, as shown. Alternatively, the center container-receiving bay 225*c* can receive a single keg 240 between the bumpers 244** as is also shown.

Figure 35:
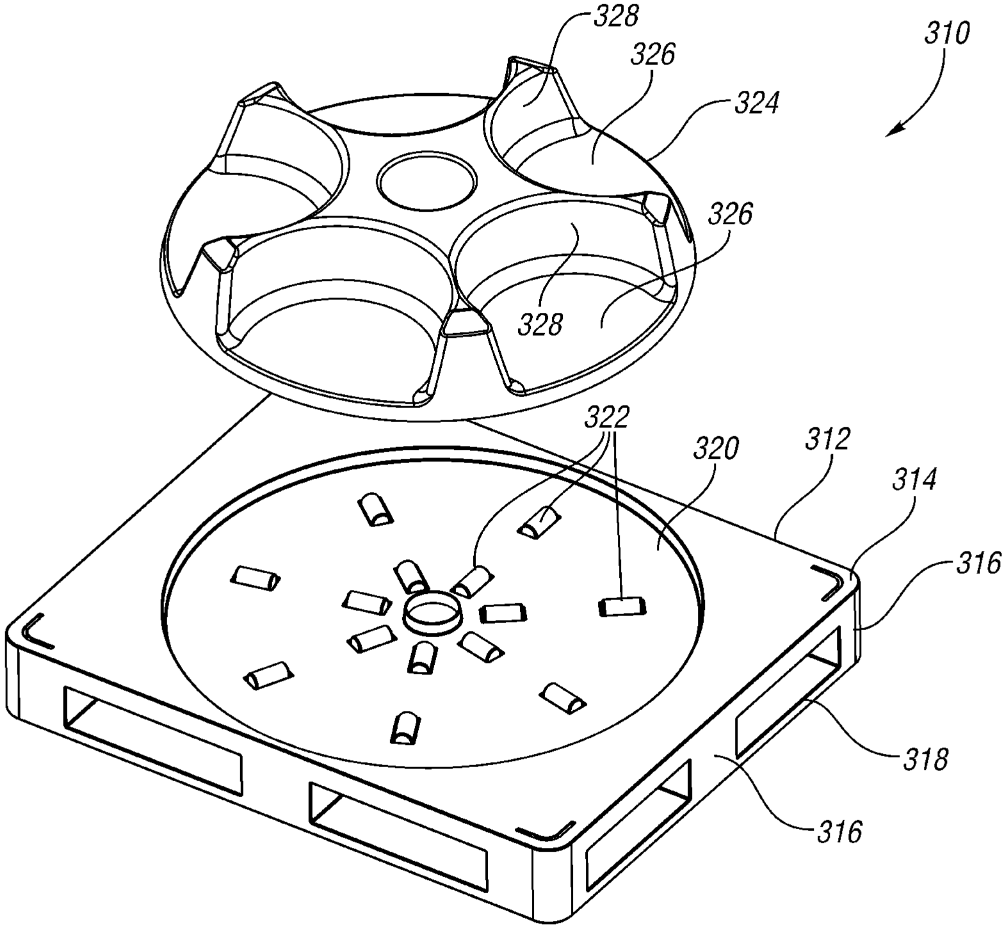
FIG. 35 shows a delivery system according to another embodiment.
Figure 36:
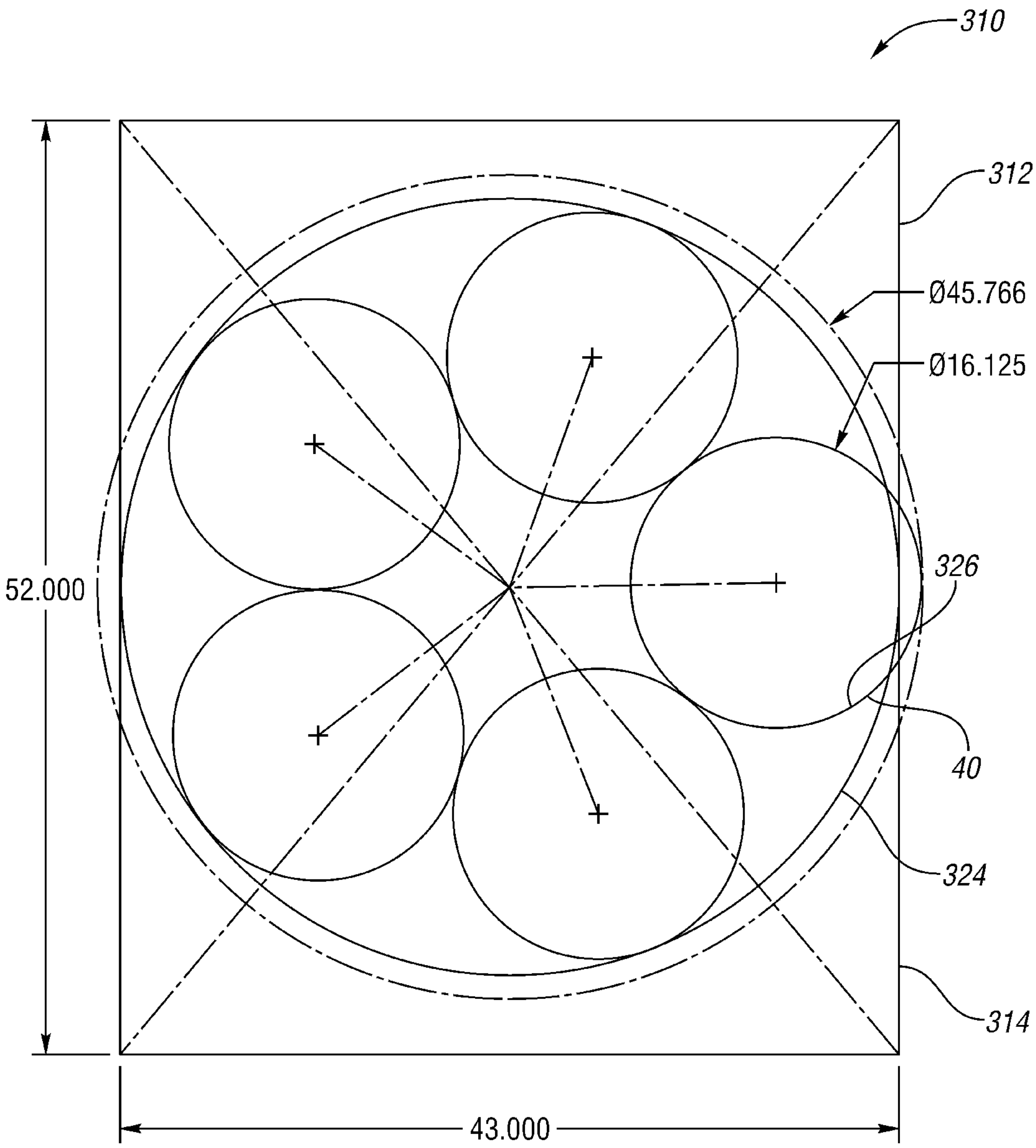
FIG. 36 is a top view of the delivery system of FIG. 34.

A keg delivery system 310 according to another embodiment is shown in FIG. 35, which could be installed in the bay of a truck. The keg delivery system 310 includes a pallet 312 having an upper deck 314 and columns 316 extending downwardly therefrom. Runners 318 may extend between lower ends of the columns 316. A circular recess 320 is formed in the upper surface of the upper deck 314. Rollers 322 are mounted in the upper deck 314 within the recess 320. Alternatively, ball bearings or conical bearings could also be used. The rollers 322 support a platform 324 within the recess 320. The platform 324 includes a plurality (in this example, 5) of keg-receiving recesses 326 separated by dividers 328 in which kegs can be placed vertically (with the bottom of the keg in the recess 326). The keg-receiving recesses 326 are open toward the exterior of the platform 324. As shown in FIG. 36, kegs 40 in the keg-receiving recesses 326 protrude outward of the footprint of the pallet 312 as the platform 324 is rotated relative to the pallet 312. With this keg-delivery system 310, the user can rotate the platform 324 relative to the pallet 312 in the bay 14 for easier access to each keg 40.

Figure 37:
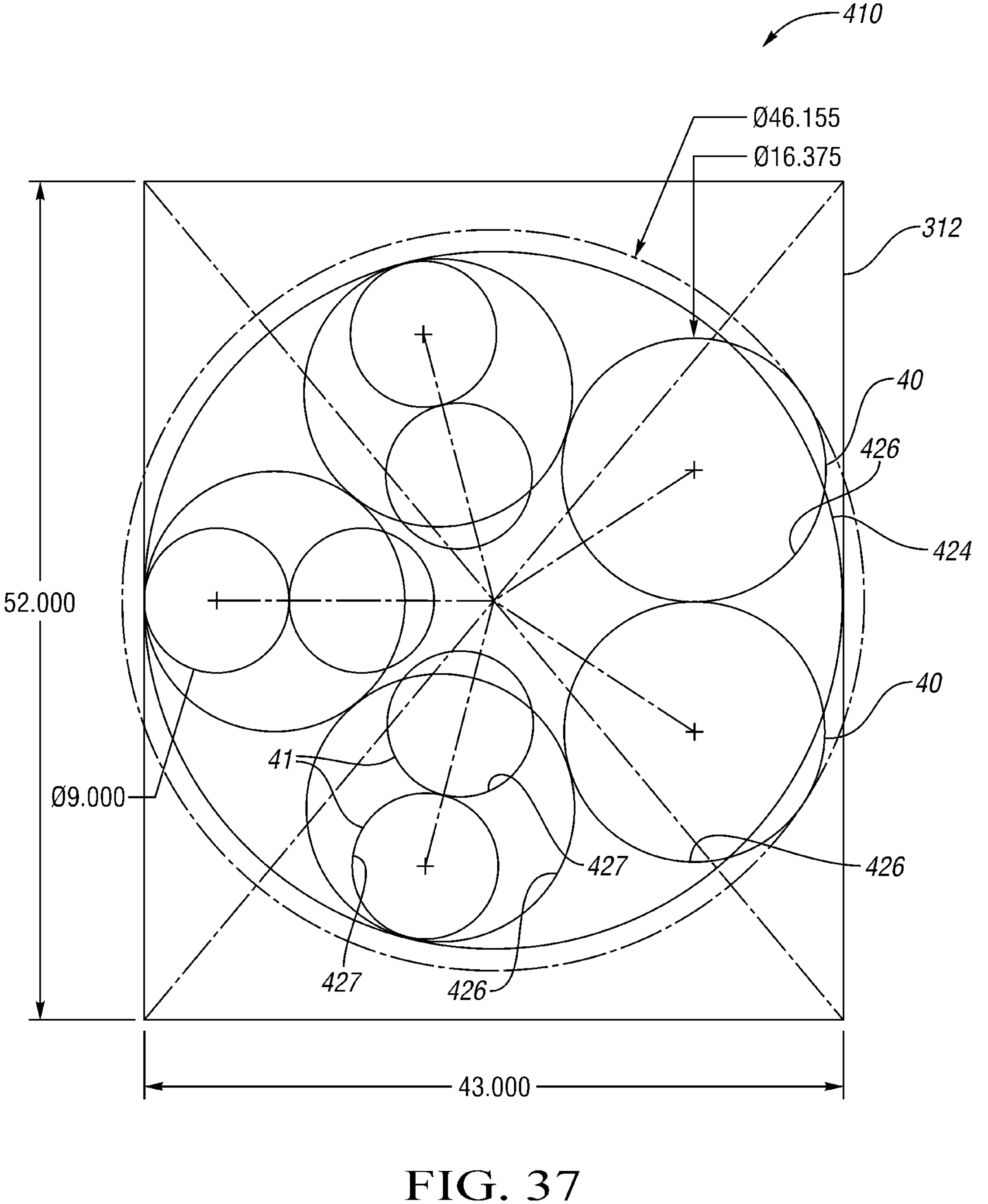
FIG. 37 shows an alternative delivery system, similar to that of FIGS. 35 and 36.

As shown in FIG. 37, an alternative keg delivery system 410, similar to that of FIGS. 35 and 36, includes a plurality of keg-receiving recesses 426 formed in the platform 424 on the pallet 112. Some of the keg-receiving recesses 426 also include sixth barrel receiving recesses 427 such that either kegs 40 or sixth barrels 41 can be received on the platform 424.

Figure 38:
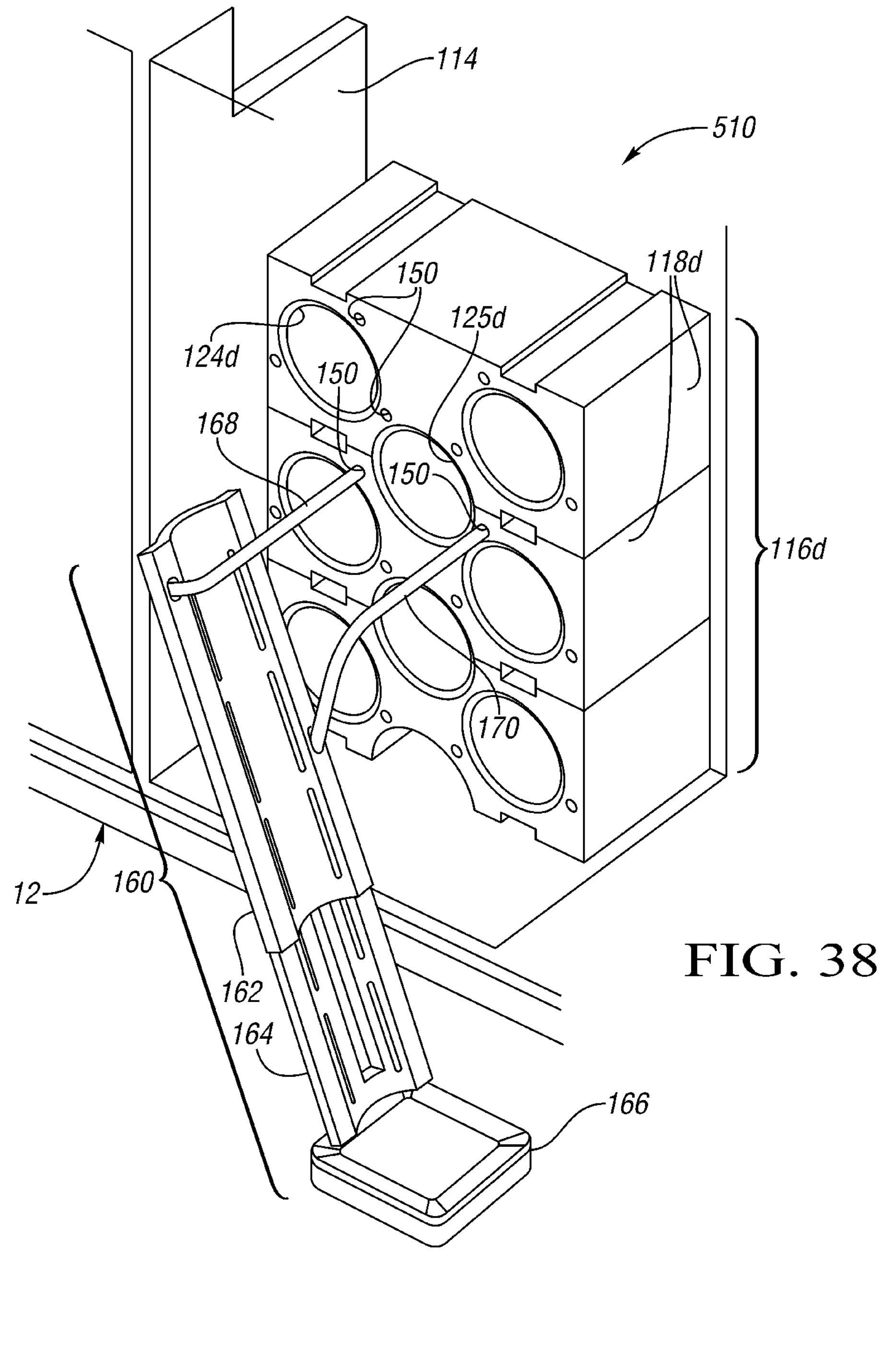
FIG. 38 shows a delivery system according to another embodiment.

A keg delivery system 310 according to another embodiment is shown in FIG. 38 installed in the bay 114 of the truck 112. A rack **116*d* includes a plurality of tiers 118*d* (which could be formed in halves). Each tier 118*d* defines two container-receiving bays 124*d* and half of another container-receiving bay 125*d*. Each tier 118*d* includes a plurality of apertures 150** on its forward face.

A slide 160 can be connected and disconnected from the rack **116*d* via rails 168, 170 selectively inserted into the apertures 150 in the rack 116*d*. The rails 168, 170 connect to an upper slide portion 162, which is telescopically connected to a lower slide portion 164. A cushioned base 166 is at the bottom of the lower slide portion 164. In use, the user can pull a keg from the bay 125*d* (or any bay 124*d*) adjacent the rails 168, 170. The keg is slid along the rails 168, 170 to the upper slide portion 162, down the upper slide portion 162 and the lower slide portion 164 to the cushioned base 166. The slide 160 can then be moved to another bay 124*d*, 125*d***.

Figure 39:
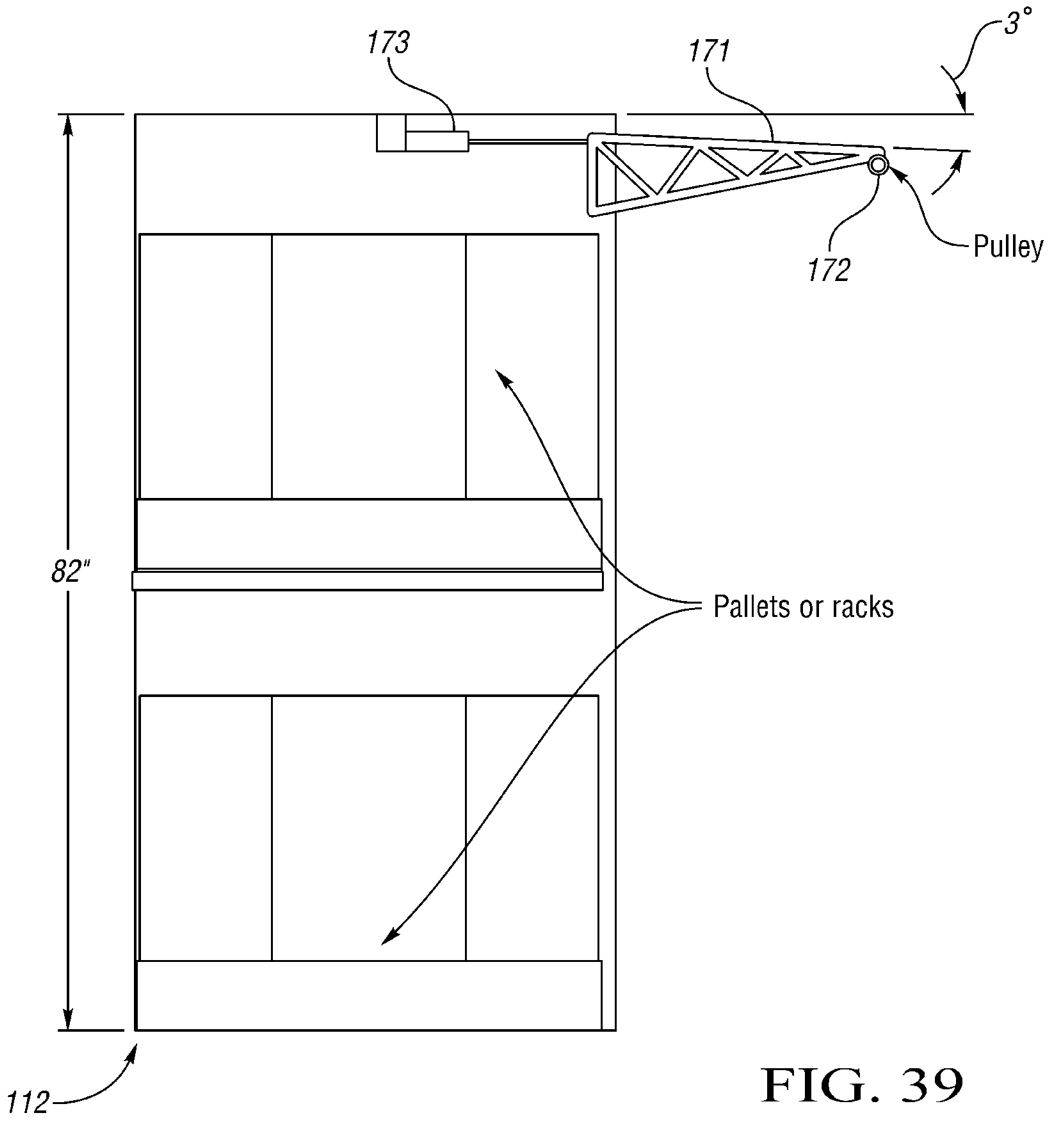
FIG. 39 shows an alternative system for removing kegs.
Figure 40:
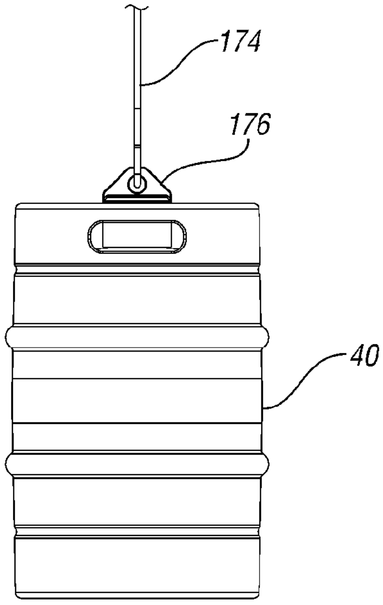
FIG. 40 shows a first method and device for securing a cable to a container.
Figure 41:
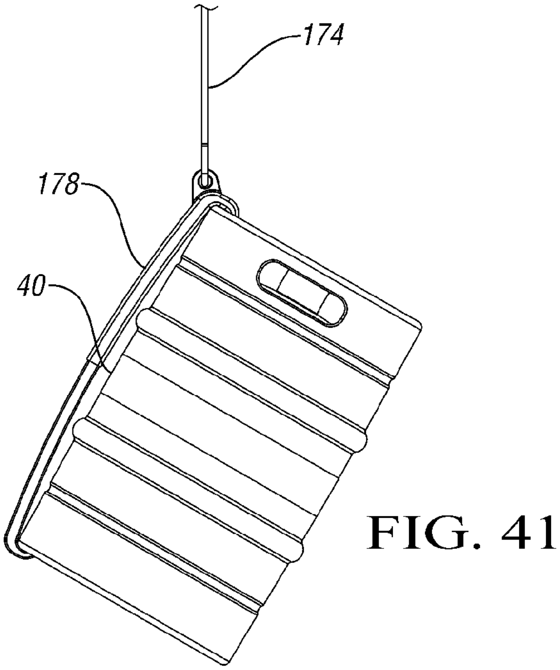
FIG. 41 shows a second method and device for securing a cable to a container.
Figure 42:
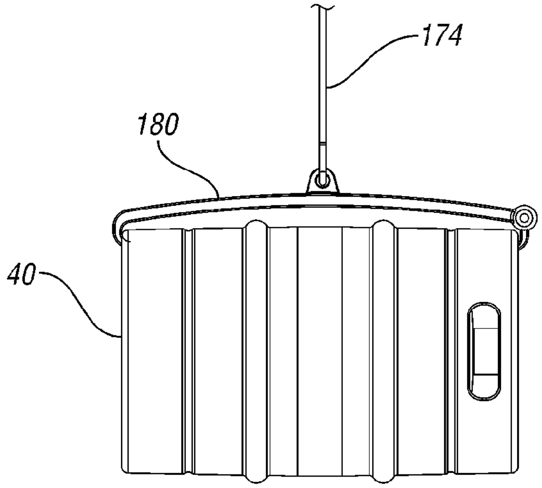
FIG. 42 shows a third method and device for securing a cable to a container.
Figure 43:
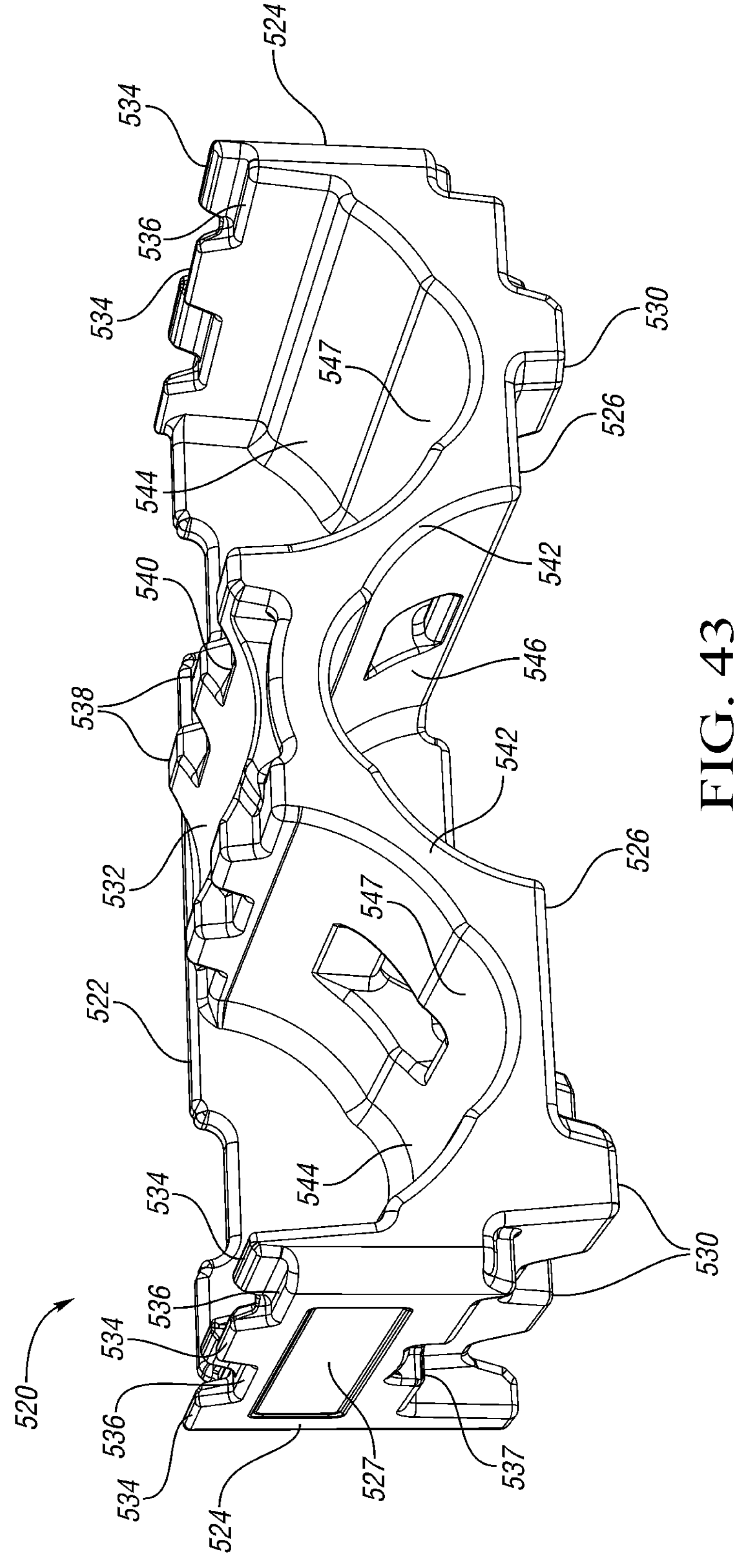
FIG. 43 is a perspective view of a rack tier half according to another embodiment.

FIG. 39 discloses an alternative means for removing kegs from any of the racks or pallets of the previous embodiments or from any other storage system. An arm or bracket 171 is pivotably mounted to the truck 112 and includes a pulley 172. A gas damper 173 is connected between the truck 112 and the bracket 171. The damper 173 keeps the bracket 171 inside the truck when no weight is applied to the bracket 171. However, when weight is applied to the bracket 171, the bracket 171 tilts downward slightly and encourages the bracket to swing outwardly. The pulley 172 has a friction brake, which permits the keg to be lowered at a controlled rate. Optionally, the system of FIG. 39 could be used in combination with the system of FIG. 38. FIG. 40 discloses a first method for securing a cable to a bracket 176 on the keg 40 at an upper axial end. As shown in FIG. 41, the cable 174 could also be secured at one end of a clamp 178 that is in turn secured at both axial ends of the keg 40. Alternatively, as shown in FIG. 42, the cable 174 could be secured to the middle of a bracket 180 secured at axial ends of the keg 40.

FIGS. 43-60 show a keg rack half 520 according to another embodiment. The keg rack half 520 is identical to that shown in FIGS. 19-30, except as specifically described below or shown in the drawings. The half 520 shown is molded as a single piece of plastic, such as by roto-molding, although with some modification, the half 520 could be injection molded. The half 520 includes a rear wall 522 and opposed side walls 524. The rear wall 522 and side walls 524 extend upward from a pair of spaced apart base walls 526. An upper wall 532 is generally centered between the base walls 526 and connected by angled walls 542. It should be noted that since the example half 520 shown is roto-molded, each of the walls 522, 524, 526, 532, 542 includes spaced apart wall stock (i.e., a double wall), which is formed in the roto-molding process. Label recesses 527 may be formed in the side walls 524 to protect labels from damage.

A plurality of feet 530 extend downward from the base walls 526. The upper edge of each side wall 524 includes a plurality of upward projections 534 alternating with complementary recesses 536. The projections 534 alternate between the inner edge and the outer edge of the side wall 524 and the arrangement of projections 534 and recesses 536 on one side wall 524 is complementary to the arrangement on the other side wall 524.

The upper wall 532 includes a plurality of upward projections 538 alternating with complementary recesses 540. The upward projections 538 and recesses 540 along one edge of the upper wall 532 is complementary to the arrangement of upward projections 538 and recesses 540 along the opposite edge. Between the side walls 524 and angled walls 542 are defined half bays 544 opening upward. Between the angled walls 542 is defined a half bay 546 opening downward. In this embodiment, each half bay 546 may include a lobe 547 for accommodating sixth-barrels. A recess 537 is defined below each side wall 524 forward of the rear wall 522.

Figure 44:
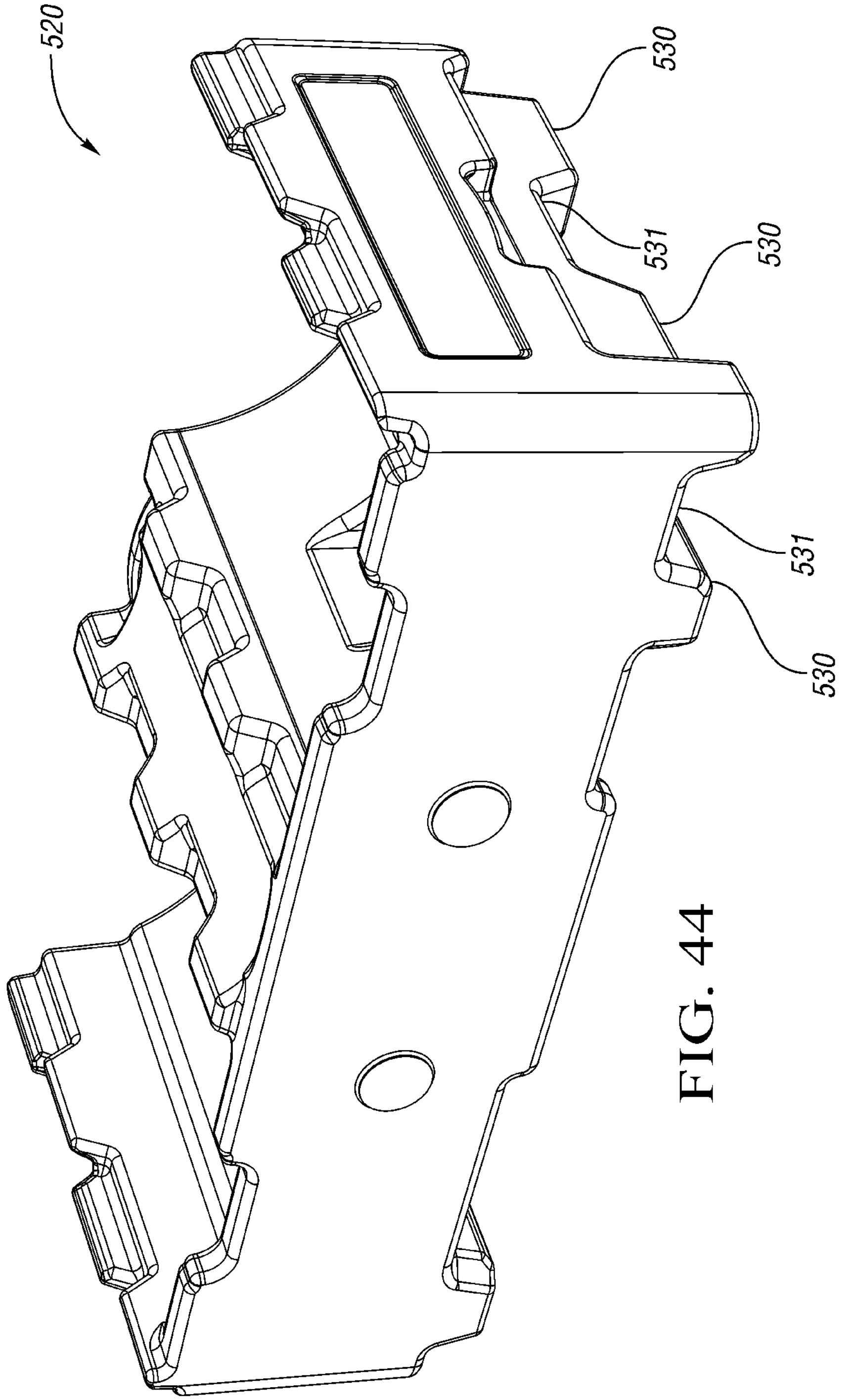
FIG. 44 is a rear perspective view of the half of FIG. 43.

FIG. 44 is a rear perspective view of the half 520. As shown, the feet 530 project downward from the base walls 526 and are spaced with complementary recesses 531.

Figure 45:
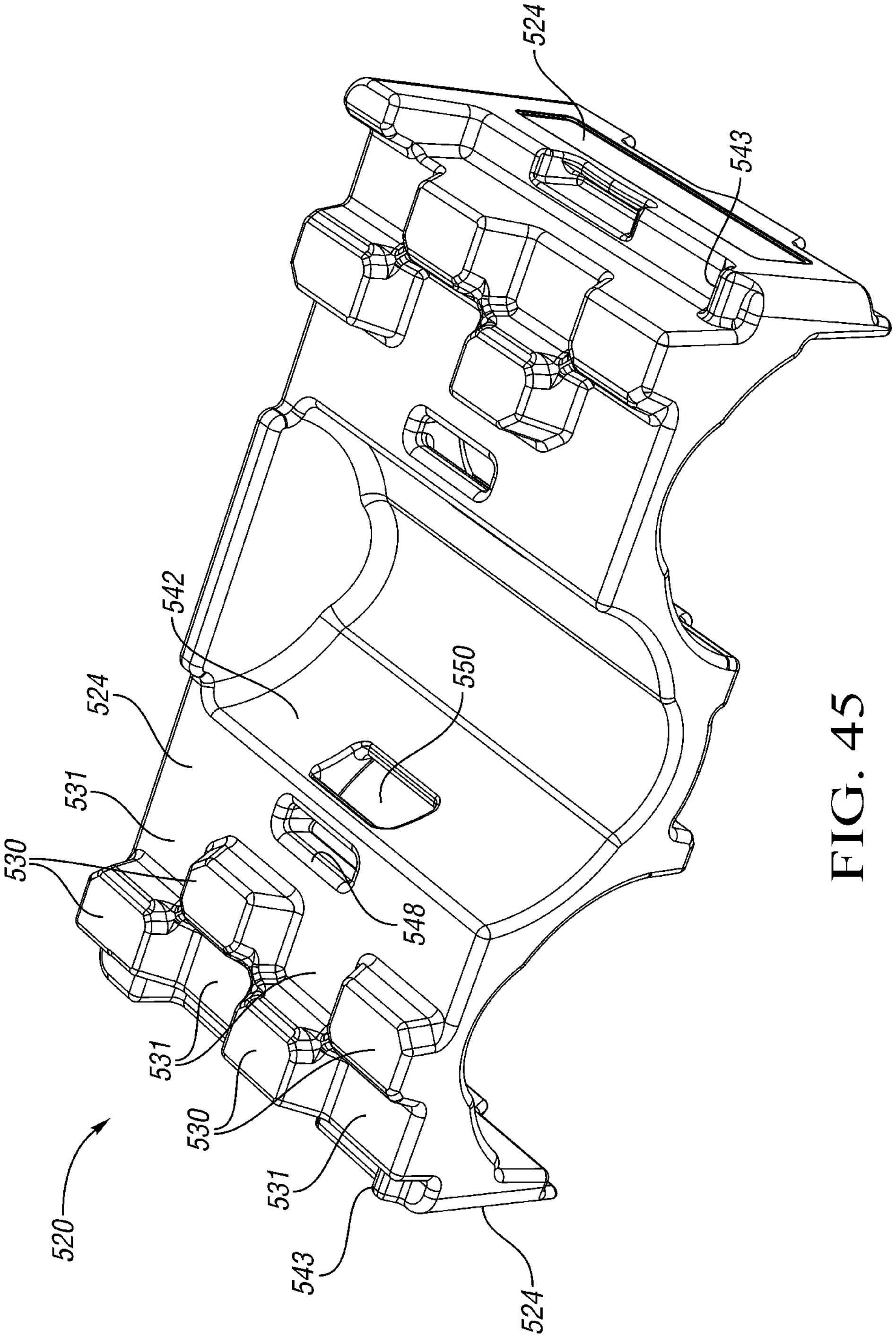
FIG. 45 is a bottom perspective view of the half of FIG. 43.

FIG. 45 is a bottom perspective view of the half 520. As shown, the feet 530 extend downward from the base walls 526 in an alternating arrangement with the recesses 531. The arrangement under one base wall 526 is complementary to the arrangement under the other base wall 526. Nesting stops 543 project downward from below the side walls 524. Handle openings 548 are defined in each base wall adjacent an inner edge. Handle openings 550 are defined in each angled wall 542 adjacent a lower edge.

Figure 46:
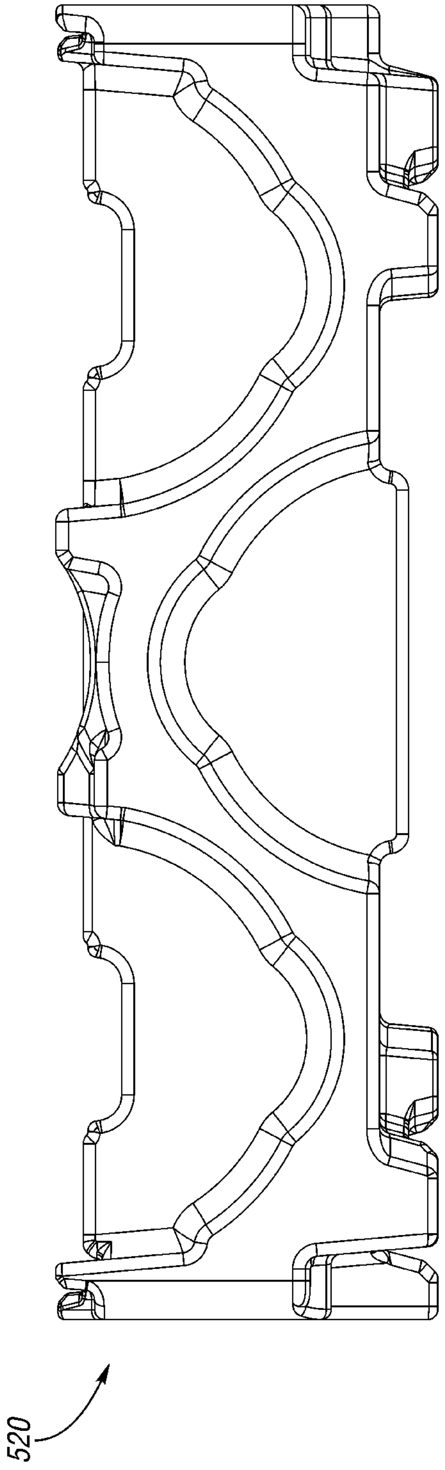
FIG. 46 is a front view of the half of FIG. 43.
Figure 47:
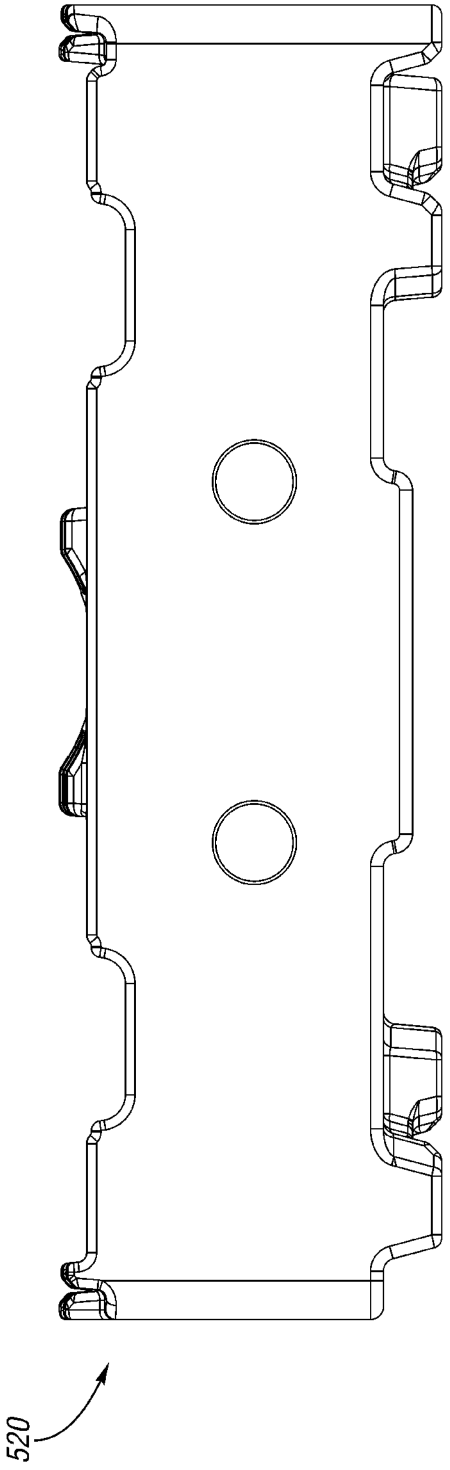
FIG. 47 is a rear view of the half.
Figure 48:
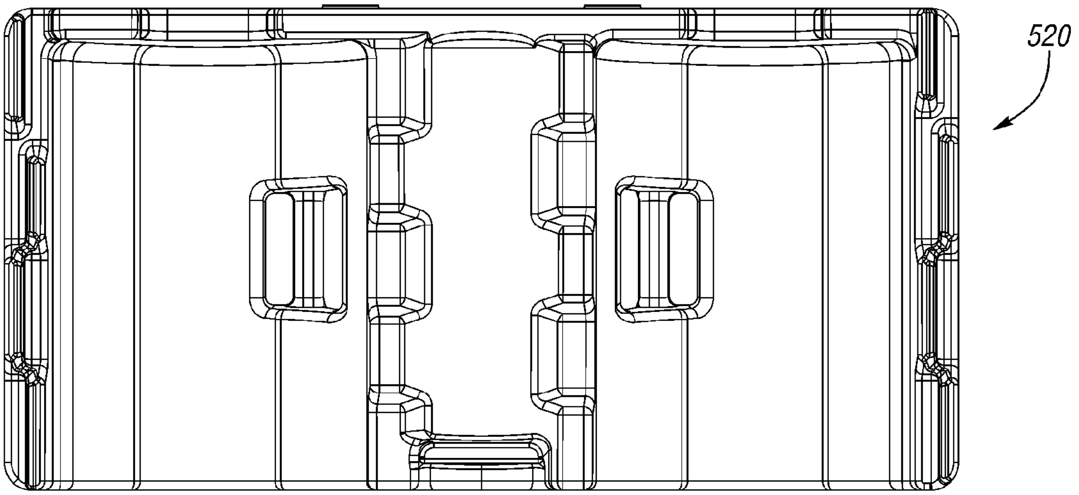
FIG. 48 is a top view of the half.
Figure 49:
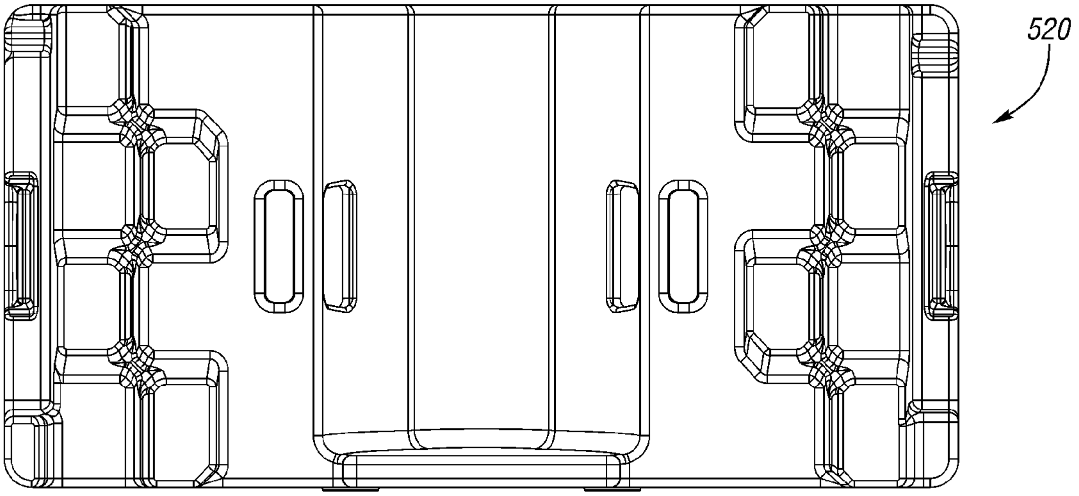
FIG. 49 is a bottom view of the half.

FIG. 46 is a front view of the half 520. FIG. 47 is a rear view of the half 520. FIG. 48 is a top view of the half 520. FIG. 49 is a bottom view of the half 520.

Figure 50:
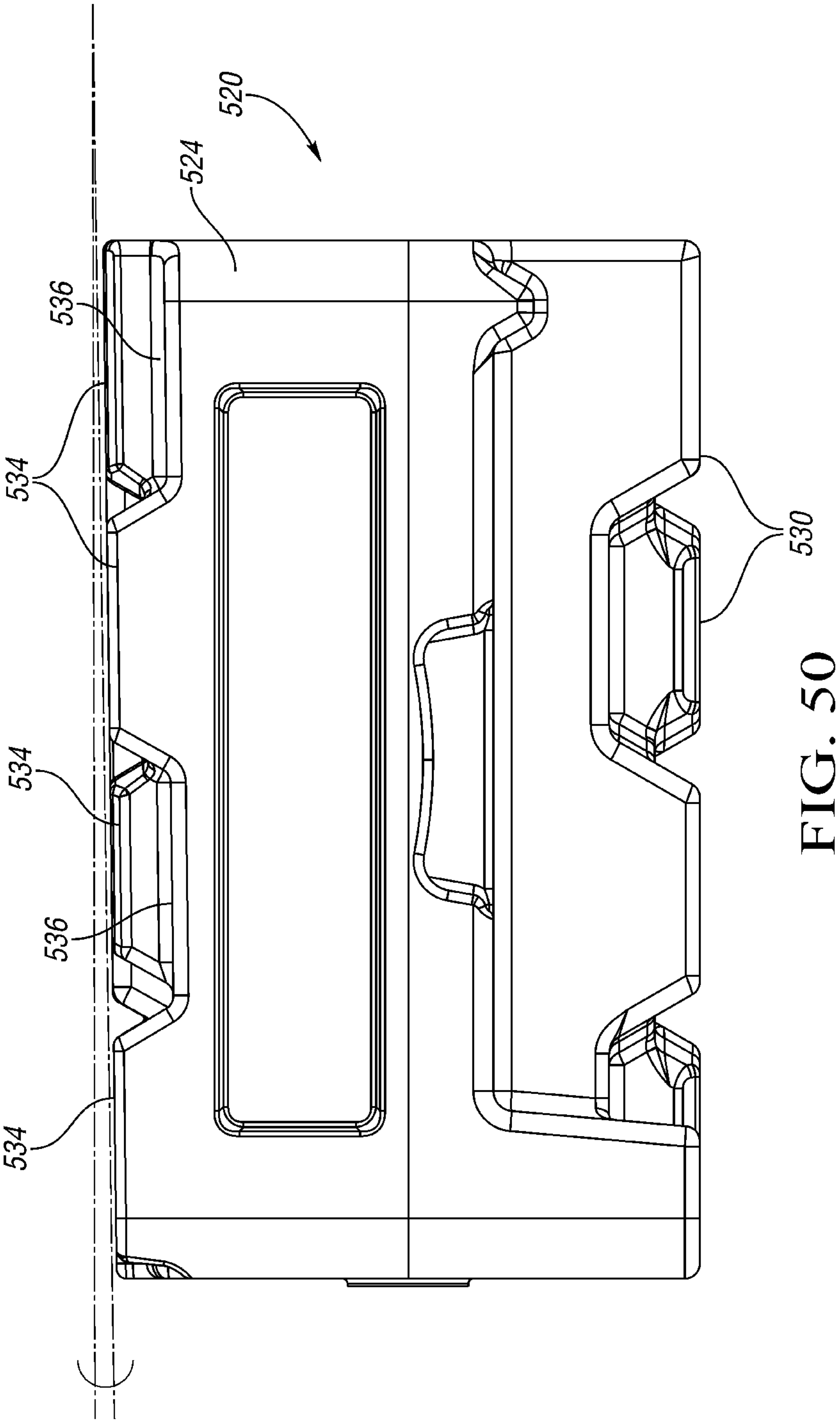
FIG. 50 is a side view of the half.

FIG. 50 is a side view of the half 520. In this embodiment, the upper edges of the side walls 524 are sloped downward to the rear of the half 520. The upward projections 534 and the recesses 536 on the side wall 520 are sloped downward toward the rear. In the example embodiment, the slope is 0.75 degrees. It is preferably more than 0.50 degrees and less than 1.50 degrees.

Figure 51:
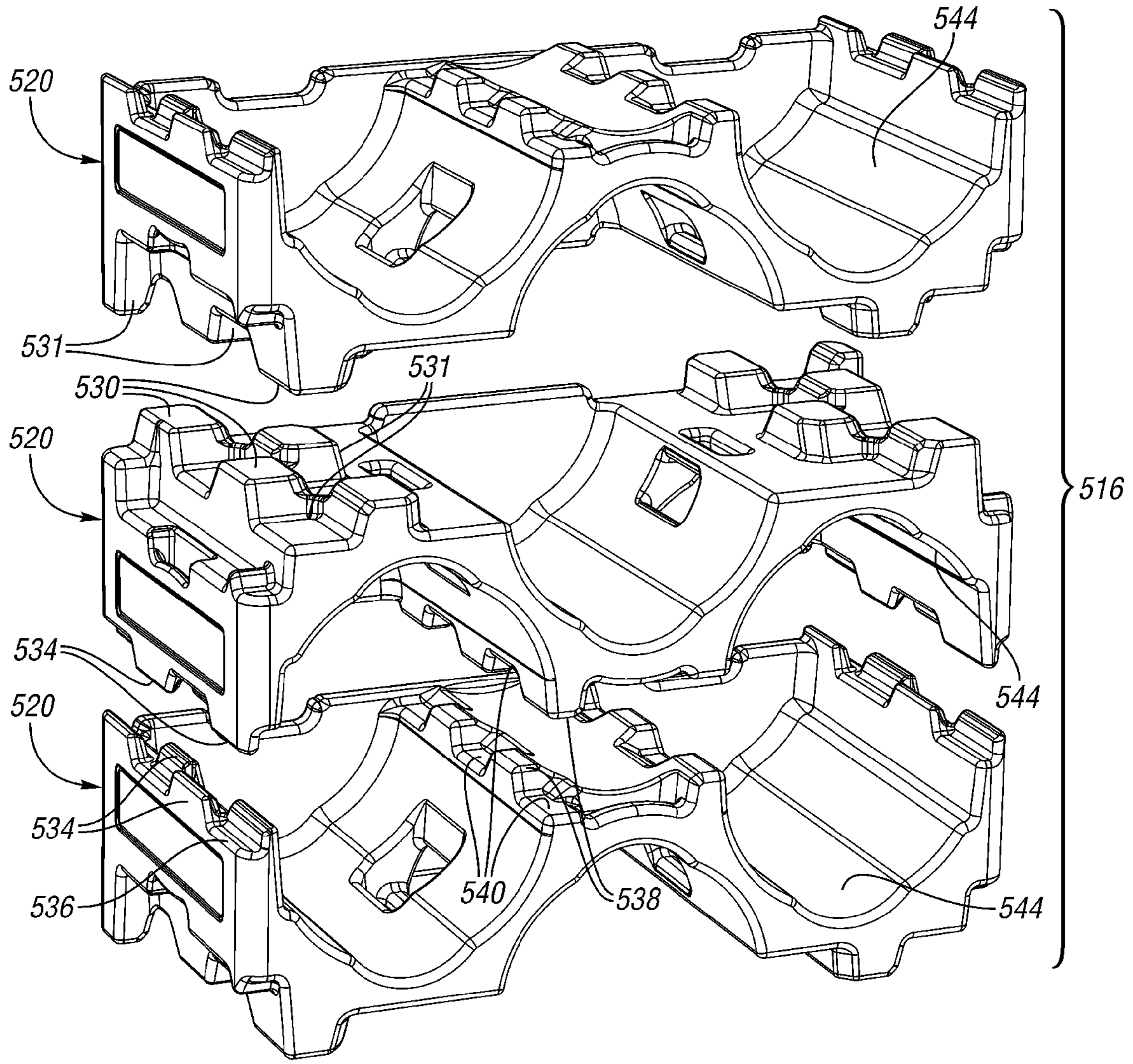
FIG. 51 shows three of the halves of FIG. 43 in an exploded view of a portion of a rack.

FIG. 51 shows three of the halves 520 in an exploded view of a portion of a rack 516. As shown, the bottom half 520 is arranged with the half bays 544 opening upward while the second half 520 is flipped so that the half bays 544 open downward. In this orientation, the arrangement of projections 534 and recesses 536 along the side walls of the lower half 520 are complementary to the arrangement of projections 534 and recesses 536 along the side walls of the second half 520. Similarly, the arrangement of projections 538 and recesses 540 on the upper wall 532 of the lower half 520 are complementary to the arrangement of projections 538 and recesses 540 on the upper wall 532 of the second half 520.

The third half 520 is also arranged with the half bays 544 opening upward. In this orientation, the feet 530 and recesses 531 are arranged in a complementary fashion to the feet 530 and recesses 531 of the second half 520.

Figure 52:
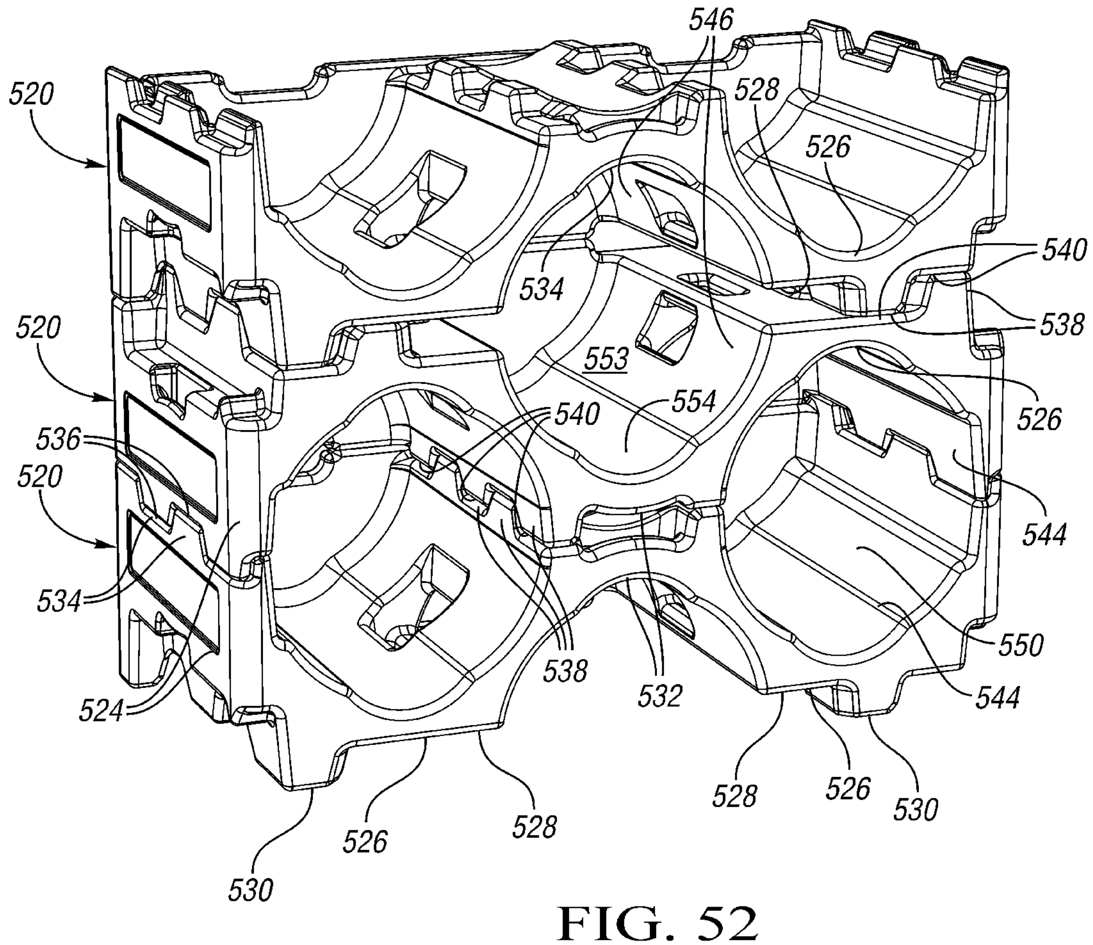
FIG. 52 shows the three halves of FIG. 51 assembled.

In FIG. 52, the three halves 520 of FIG. 26 are assembled. The projections 534 and recesses 536 along the side walls 524 of the lower half 520 and the second half 520 are interlocked, as are the projections 538 and recesses 540 of the upper walls 532 of the lower half 520 and second half 520. Further, the feet 530 and recesses 531 of the base walls 526 of the second half 520 and the third half 520 interlock. This provides a stable portion of a rack. The half bays 544 of the lower half 520 and the second half 520 open toward one another to define keg receiving bays 550. The half bays 546 of the second half 520 and the upper half 520 also face each other to define a keg receiving bay 554. As disclosed in the previous embodiment, the bays 550, 552 may include lobes 554.

Between the upper half 520 and the second half 520, the offset feet 530 create a fork tine-receiving opening 528 between the base walls 526 of the two halves 520 on either side of the center bay 552. Further, the feet 530 of the lower half 520 define fork tine-receiving openings 528 below the base walls 526 above the floor. The openings 528 are the same height between the lower half 520 and the floor as between the upper half 520 and the second half 520.

Figure 53:
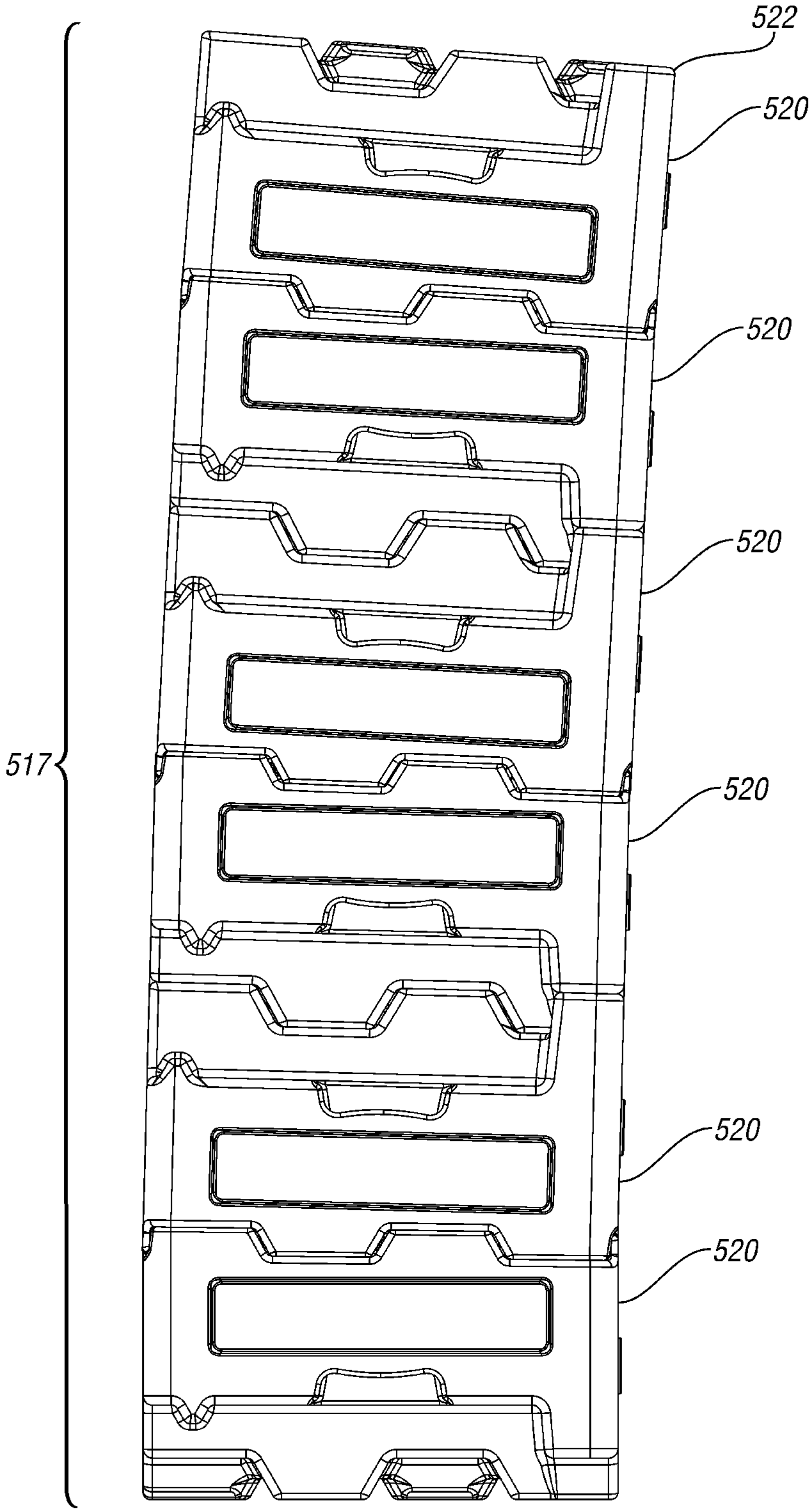
FIG. 53 is a side view of a rack formed of six of the halves of FIG. 43.

FIG. 53 is a side view of a keg rack 517 formed of a stack of six halves 520. As shown, due to the sloped side walls, the keg rack leans rearward. This is a compensation for the weight of kegs in the rack, which will compress the front of the halves 520 more than the rear because the front is more open and the rear is more rigid because of the rear wall 522. The (example) slope of 0.75 degrees on each half 520 accumulates upward through the stack.

Figure 54:
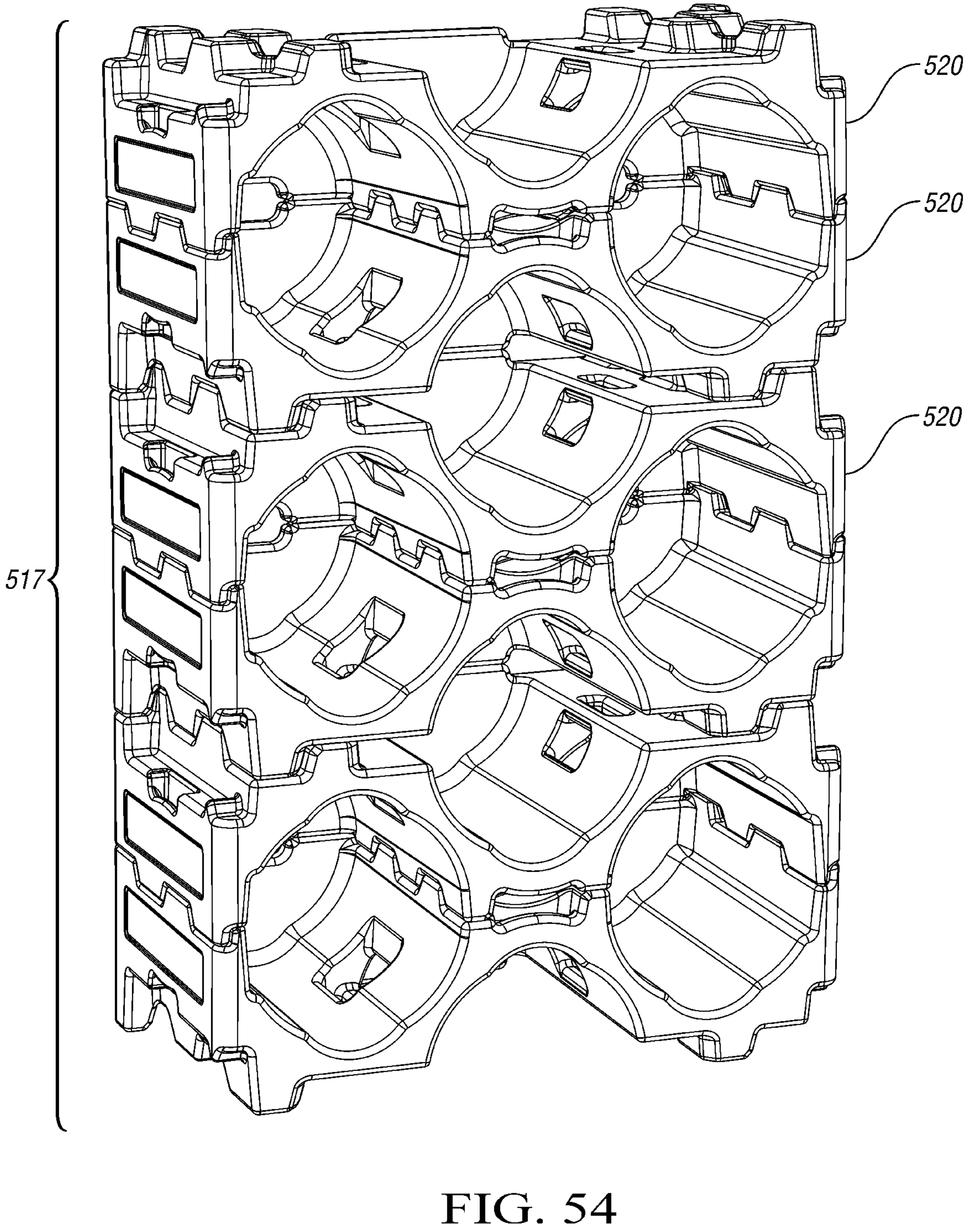
FIG. 54 is a perspective view of the keg rack of FIG. 53.

FIG. 54 is a perspective view of the keg rack 517 of FIG. 53.

Figure 55:
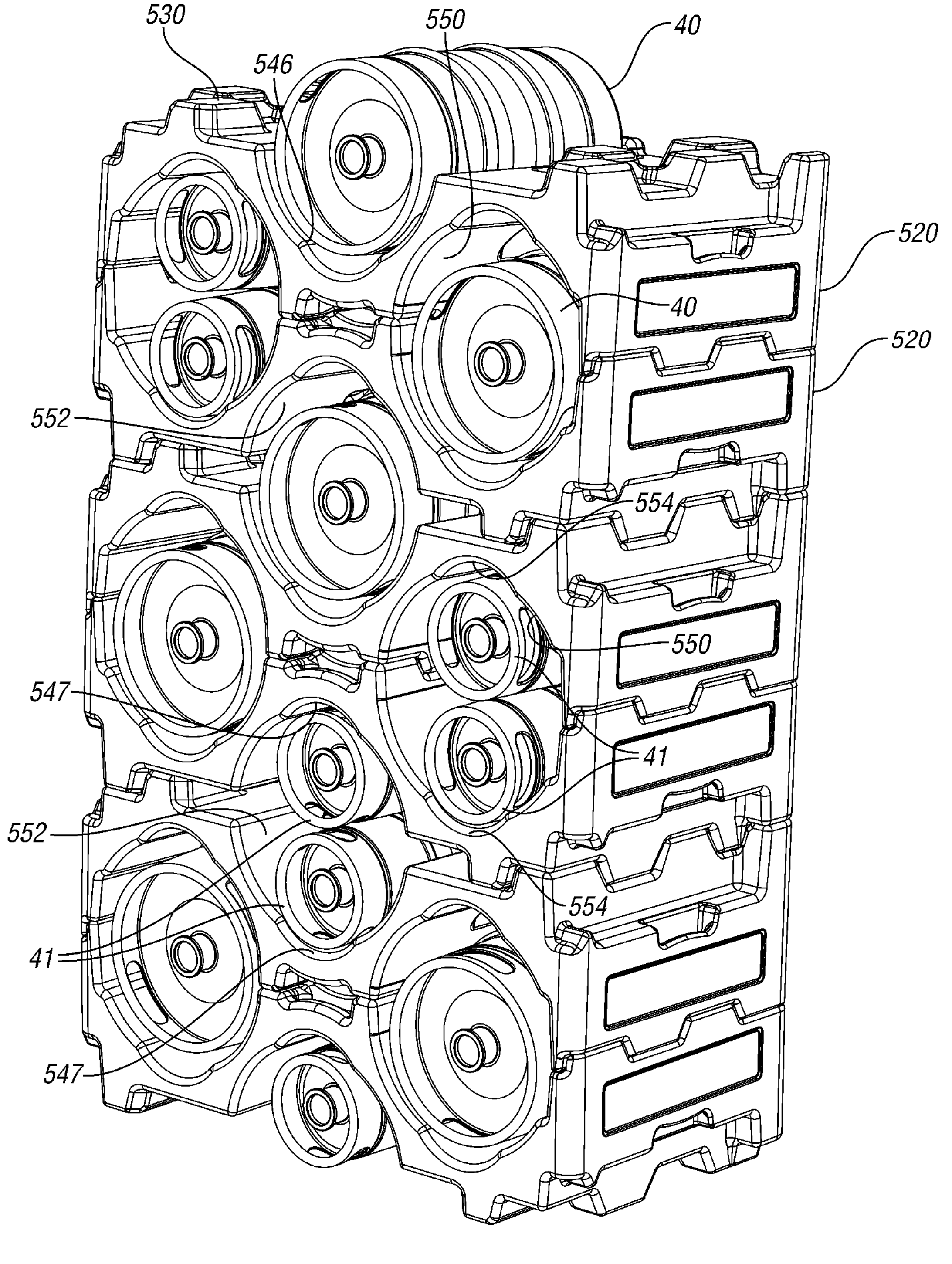
FIG. 55 shows the keg rack of FIG. 53 loaded with kegs.
Figure 56:
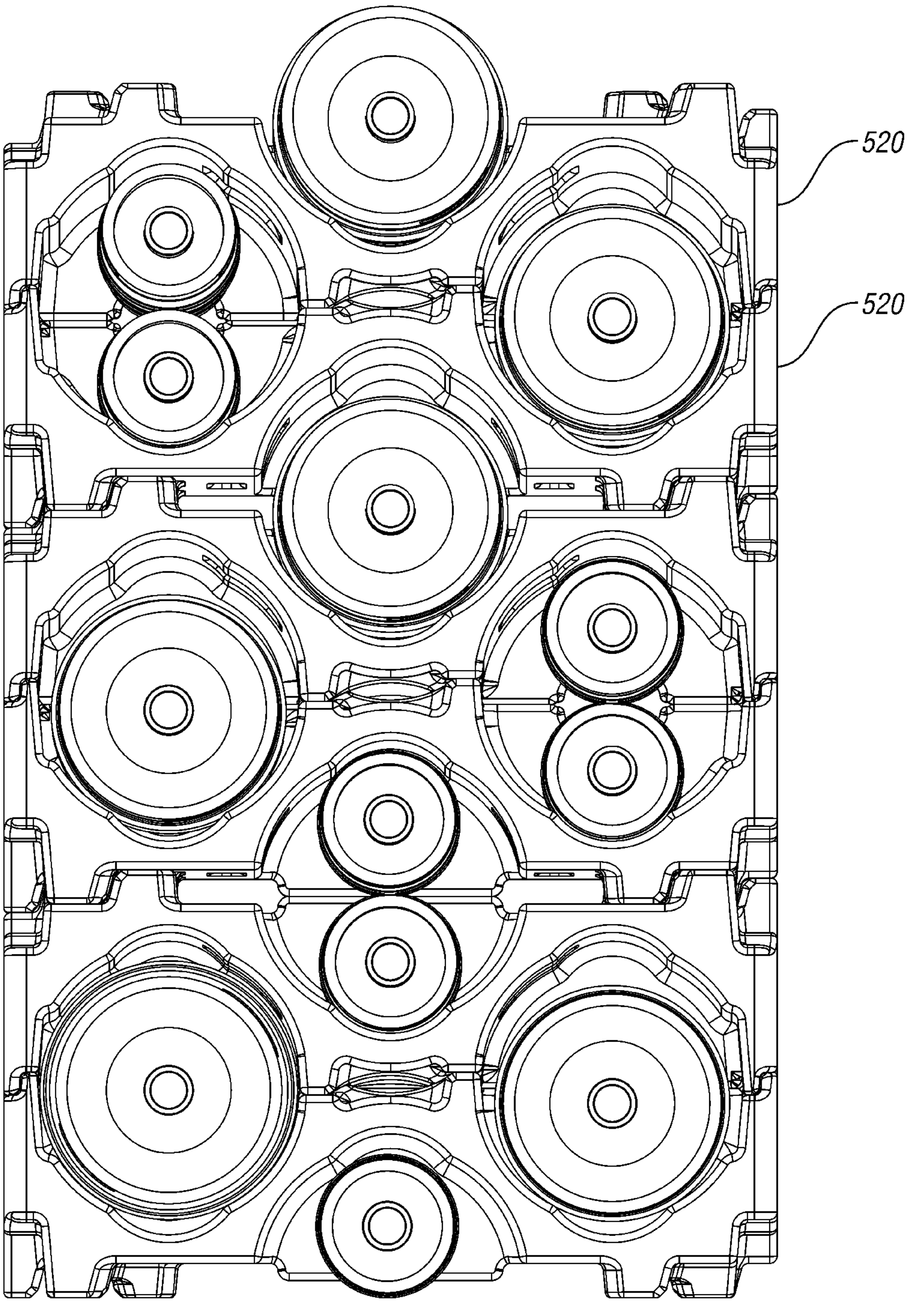
FIG. 56 is a front view of the keg rack and kegs of FIG. 55.

In FIG. 55, the bays 550, 552 are loaded with kegs 40, and may be loaded with two sixth-barrels 41, aligned with the lobes 554, 547. An uppermost keg 40 can be stacked on the half bay 546. Under the weight of the kegs 40 and sixth-barrels 41, the lean in the stack may reduce or disappear. FIG. 56 is a front view of the keg rack of FIG. 55.

Figure 57:
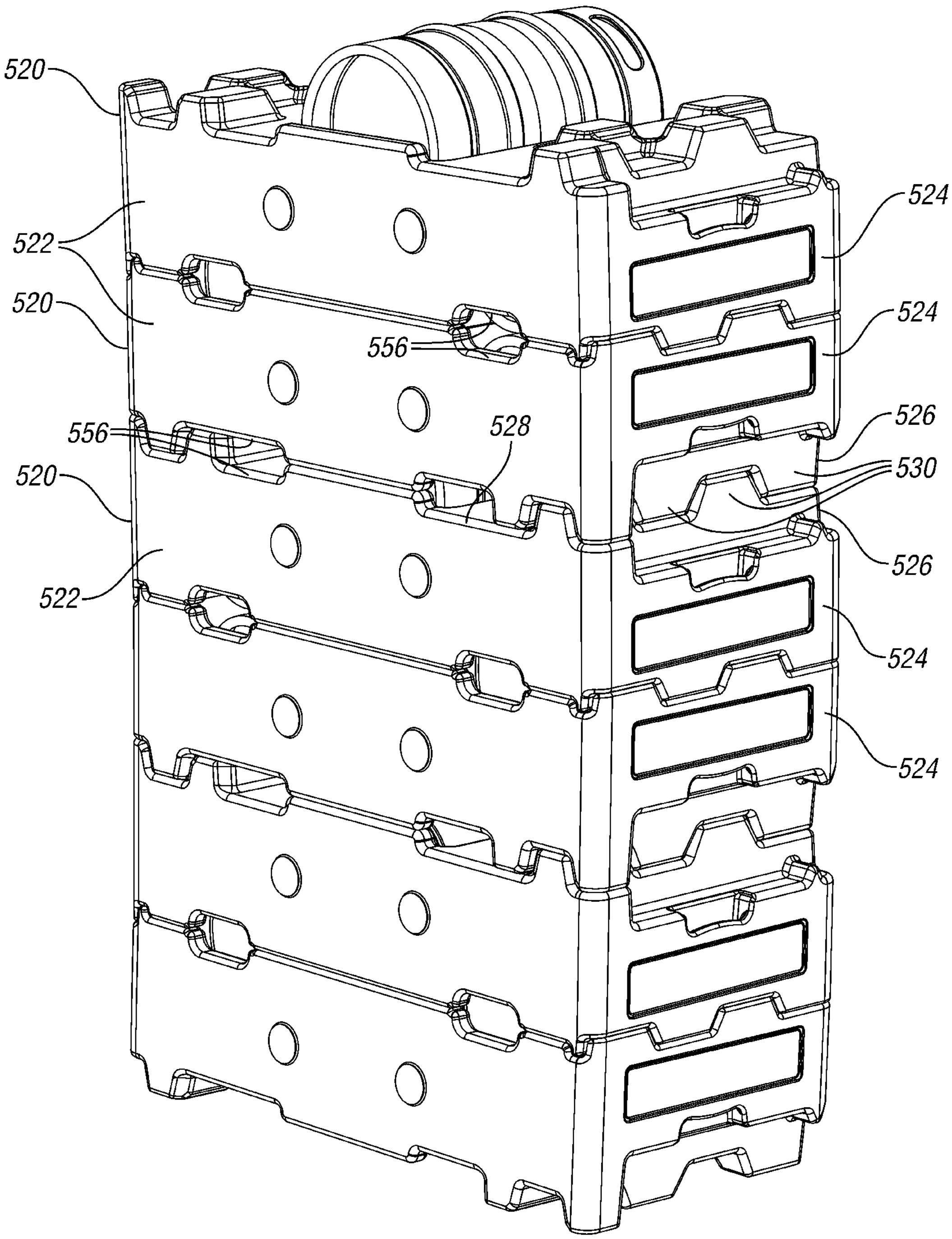
FIG. 57 is a rear view of the rack of FIG. 55.

FIG. 57 is a rear view of the rack 517 of FIG. 55. As shown, the rear walls 522 of the halves 520 are aligned for weight transfer. Further, the side walls 524 are aligned for alternating pairs of halves 520. The other pairs of halves transfer weight via the feet 530 and bases 526. In this manner, multiple racks 516 can be assembled inside vehicles or at storage facilities and loaded with kegs 40, sixth-barrels 41 or other size containers. The rear walls 522 include recesses 556 at lower edges so that the fork-tine openings 528 are accessible from the rear of the stack. The rack 516 can be loaded and/or carried by a fork truck from either the front or rear of the rack 516.

Figure 58:
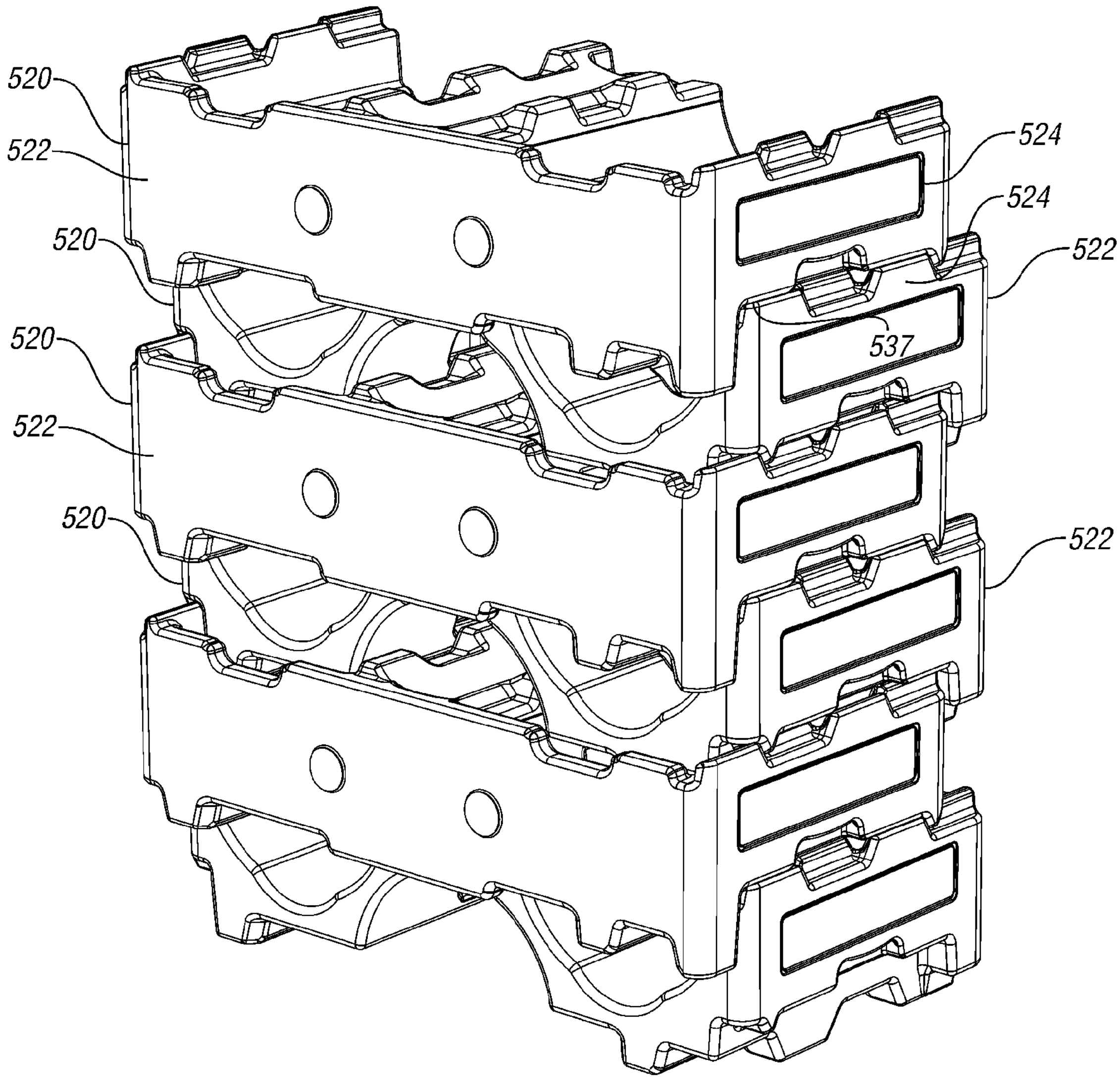
FIG. 58 shows the halves of the rack of FIG. 53 in a reduced volume, empty, shipping stack configuration.
Figure 60:
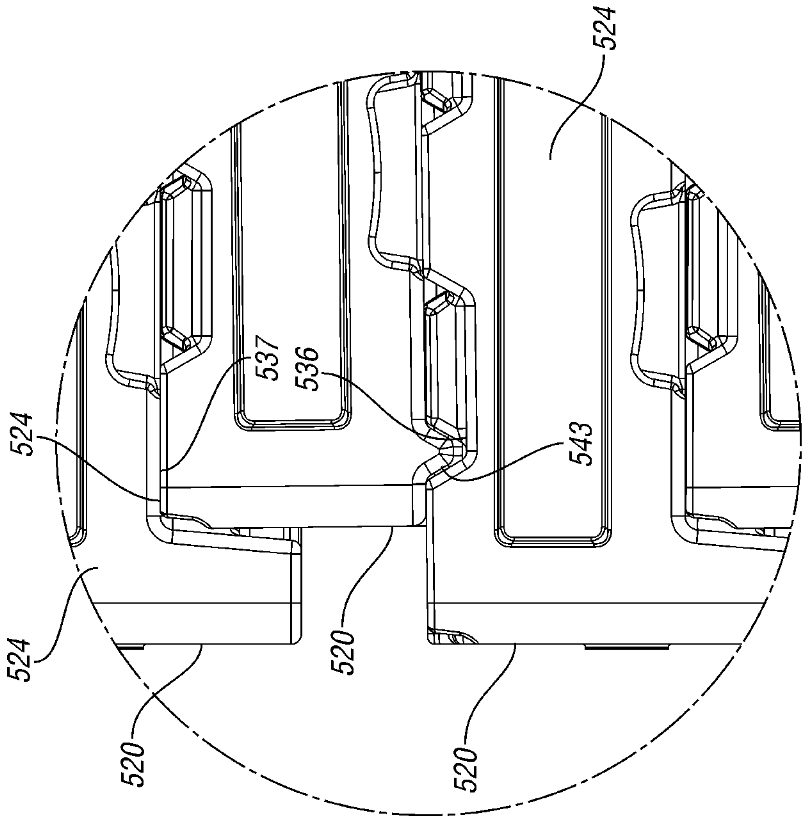
FIG. 60 is an enlarged view of a portion of FIG. 59.
Figure 59:
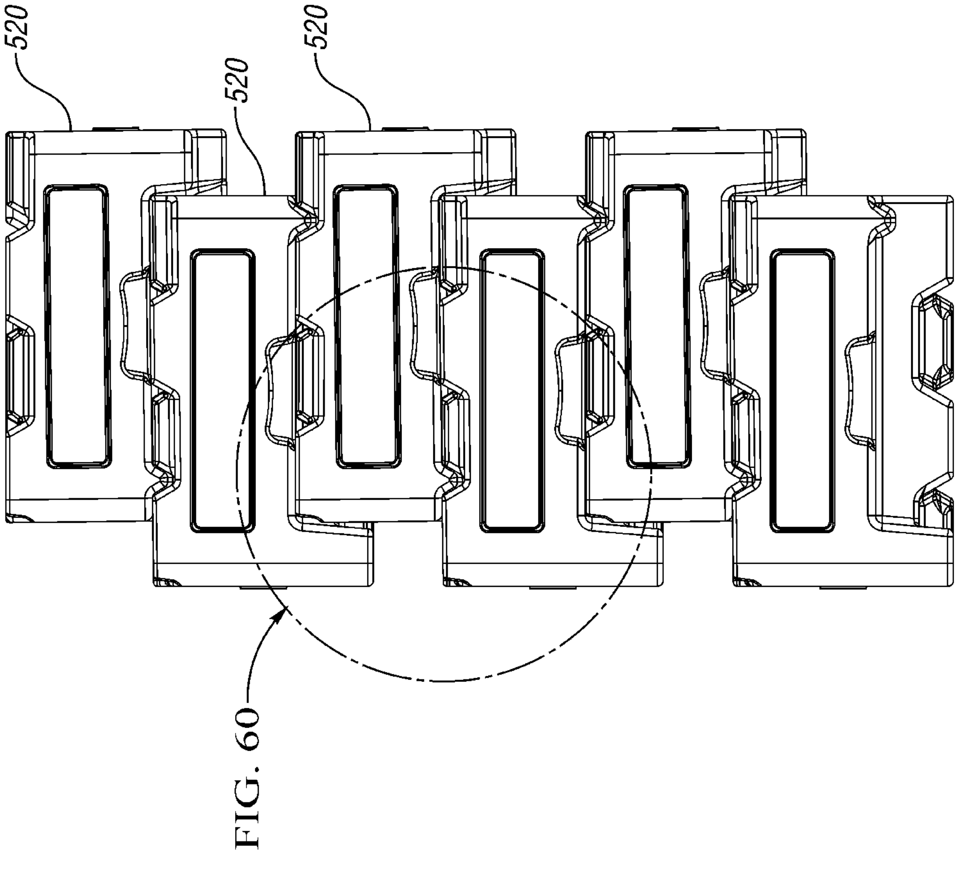
FIG. 59 is a side view of the stack of FIG. 58.

When empty, the halves 520 can be rearranged and stacked as shown in FIG. 58 to reduce storage or shipping volume. In FIG. 58, all of the halves 520 are oriented with the bays 544 opening upward, but alternating halves 520 are rotated about a vertical axis such that the rear walls 522 in adjacent halves 520 are on opposite sides of the stack. As shown in FIG. 59, the halves 520 are offset rearwardly of one another such that the side walls 524 can be received in the recess 537 below the side wall above (FIG. 60). As shown in FIG. 60, the nesting stops 543 are received in the recesses 536 of the adjacent half 520.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A keg rack tier half comprising:

a base;

a rear wall at a rear end of the base; and a pair of opposed side walls extending upward from the base, the side walls including a plurality of interlockable features such that the tier half can be inverted and stacked upon an identical tier half, with the interlockable features of the side walls of the tier half interlocking with the interlockable features of the side walls of the identical tier half, a plurality of container-receiving bay halves defined by the base, the rear wall and the side walls, wherein the keg rack tier half is formed as a single piece of plastic.

2. The keg rack tier half of claim 1 further including a plurality of feet protruding downward from the base, the plurality of feet arranged with a plurality of alternating recesses such that the identical tier half can be stacked on the inverted tier half with the feet and recesses of the identical tier half interlocking with the feet and recesses of the identical tier half.

3. The keg rack tier half of claim 1 wherein the bay halves have generally concave inner walls with lobes for accommodating sixth barrels.

4. The keg rack tier half of claim 1 wherein the keg rack tier half is stackable directly on an identical keg rack tier half at a first height in a first orientation with the rear walls aligned and is stackable directly on the identical keg rack tier half at a second height, lower than the first height, in a second orientation with the rear walls rotated 180 degrees relative to one another.

5. The keg rack tier half of claim 1 further including a pair of angled walls between the side walls, one of the plurality of container-receiving bay halves defined between each of the pair of angled walls and one of the pair of side walls and opening upwardly, a third one of the plurality of container-receiving bay halves defined between the pair of angled walls, opening downwardly.

6. The keg rack tier half of claim 1 wherein the rear wall and the side walls are each double walls having spaced-apart wall stock.

7. The keg rack tier half of claim 1 wherein the plurality of bay halves includes a first bay half between a second bay half and one of the pair of side walls.

8. The keg rack tier half of claim 1 wherein the rear wall extends from a rear portion of one of the side walls toward the other of the side walls.

9. A keg rack tier half comprising:

a base;

a rear wall extending upward from a rear end of the base; and a pair of opposed side walls extending upward from the base, the rear wall connecting rear portions of the side walls to one another, the side walls including a plurality of interlockable features such that the tier half can be inverted and stacked upon an identical tier half, with the interlockable features of the side walls of the tier half interlocking with the interlockable features of the side walls of the identical tier half, a plurality of container-receiving bay halves defined by the base, the rear wall and the side walls, wherein the side walls are sloped downwardly and rearwardly from a front end of the tier half toward the rear wall.

10. A keg rack tier half comprising:

a base;

a rear wall extending upward from a rear end of the base; and a pair of opposed side walls extending upward from the base, the rear wall extending from one of the side walls to the other of the side walls, the side walls including a plurality of interlocking features, a plurality of container-receiving bay halves defined by the base, the rear wall and the side walls, the bay halves having generally concave inner walls, wherein at least one of the bay halves includes at least one lobe, wherein the lobe has a concave lobe wall having a radius smaller than a radius of the concave inner wall of the at least one bay half and wherein the lobe is offset relative to the at least one bay half, wherein the lobe can accommodate a sixth barrel on the concave lobe wall.

11. The keg rack tier half of claim 10 wherein the side walls are sloped downwardly and rearwardly from a front end of the tier half toward the rear wall.

12. The keg rack tier half of claim 11 further including a plurality of feet protruding downward from the base, the plurality of feet arranged with a plurality of alternating recesses.

13. The keg rack tier half of claim 12 wherein the keg rack tier half is formed as a single piece of plastic.

14. The keg rack tier half of claim 13 wherein the keg rack tier half is stackable on an identical keg rack tier half at a first height in a first orientation with the rear walls aligned and is stackable at a second height, lower than the first height, in a second orientation with the rear walls rotated 180 degrees relative to one another.

15. The keg rack tier half of claim 10 further including a plurality of feet protruding downward from the base, the plurality of feet arranged with a plurality of alternating recesses.

16. The keg rack tier half of claim 10 wherein the keg rack tier half is formed as a single piece of plastic.

17. The keg rack tier half of claim 10 wherein the keg rack tier half is stackable directly on an identical keg rack tier half at a first height in a first orientation with the rear walls aligned and is stackable directly on the identical keg rack tier half at a second height, lower than the first height, in a second orientation with the rear walls rotated 180 degrees relative to one another.

18. The keg rack tier half of claim 10 wherein the rear wall extends from one of the side walls toward the other of the side walls.

19. A keg rack tier half comprising:

a base;

a rear wall at a rear end of the base;

a pair of opposed side walls extending upward from sides of the base, the side walls including a plurality of interlocking features; and a pair of angled walls between the pair of opposed side walls, a pair of container-receiving bay halves defined between each of the angled walls and a respective one of the side walls, the pair of container-receiving bay halves opening upwardly, the rear wall partially covering an axial end of each of the pair of container-receiving bay halves, a third container-receiving bay half defined between the pair of angled walls opening downwardly, wherein the keg rack tier half is formed as a single piece of plastic.

20. The keg rack tier half of claim 19 wherein the rear wall extends upward from the rear end of the base.

21. The keg rack tier half of claim 20 wherein the rear wall extends from one of the side walls to the other of the side walls.

22. The keg rack tier half of claim 19 wherein the rear wall extends from one of the side walls toward the other of the side walls.

23. The keg rack tier half of claim 19 wherein the rear wall extends from a rear portion of one of the side walls toward the other of the side walls.

24. A keg rack tier half comprising:

a base;

a rear wall at a rear end of the base; and a pair of opposed side walls extending upward from the base, the side walls including a plurality of interlockable features such that the tier half can be inverted and stacked upon an identical tier half, with the interlockable features of the side walls of the tier half interlocking with the interlockable features of the side walls of the identical tier half, a plurality of container-receiving bay halves defined by the base, the rear wall and the side walls, wherein the keg rack tier half is formed as a single piece of plastic.

25. The keg rack tier half of claim 24 further including a plurality of feet protruding downward from the base, the plurality of feet arranged with a plurality of alternating recesses such that the identical tier half can be stacked on the inverted tier half with the feet and recesses of the identical tier half interlocking with the feet and recesses of the identical tier half.

26. The keg rack tier half of claim 24 wherein the bay halves have generally concave inner walls with lobes for accommodating sixth barrels.

27. The keg rack tier half of claim 24 wherein the rear wall extends from a rear portion of one of the side walls toward the other of the side walls.

28. A keg rack tier half comprising:

a base;

a rear wall at a rear end of the base; and a pair of opposed side walls extending upward from the base, the side walls including a plurality of interlocking features, a plurality of container-receiving bay halves defined by the base, the rear wall and the side walls, the bay halves having generally concave inner walls, wherein at least one of the bay halves includes at least one lobe, wherein the lobe has a concave lobe wall having a radius smaller than a radius of the concave inner wall of the at least one bay half and wherein the lobe is offset relative to the at least one bay half, wherein the lobe can accommodate a sixth barrel on the concave lobe wall.

29. The keg rack tier half of claim 28 wherein the side walls are sloped downwardly and rearwardly from a front end of the tier half toward the rear wall.

30. The keg rack tier half of claim 29 further including a plurality of feet protruding downward from the base, the plurality of feet arranged with a plurality of alternating recesses.

31. The keg rack tier half of claim 28 wherein the rear wall extends from a rear portion of one of the side walls toward the other of the side walls.

* * * * *